United States Patent
Park et al.

(10) Patent No.: US 9,444,098 B2
(45) Date of Patent: Sep. 13, 2016

(54) POSITIVE ACTIVE MATERIAL, METHOD OF PREPARING THE SAME, AND LITHIUM BATTERY INCLUDING THE POSITIVE ACTIVE MATERIAL

(71) Applicants: Samsung SDI Co., Ltd., Yongin-si, Gyeonggi-do (KR); Samsung Corning Precision Materials Co.,Ltd., Asan-si, Chungcheongnam-do (KR); Samsung Fine Chemicals Co., Ltd., Ulsan (KR)

(72) Inventors: Jun-ho Park, Changwon-si (KR); Jun-young Mun, Seoul (KR); Jin-hwan Park, Seoul (KR); Jae-gu Yoon, Suwon-si (KR)

(73) Assignee: SAMSUNG SDI CO., LTD., Yongin-si, Gyoenggi-do (KR)

( * ) Notice: Subject to any disclaimer, the term of this patent is extended or adjusted under 35 U.S.C. 154(b) by 147 days.

(21) Appl. No.: 13/849,839

(22) Filed: Mar. 25, 2013

(65) Prior Publication Data
US 2014/0106222 A1    Apr. 17, 2014

(30) Foreign Application Priority Data

Oct. 15, 2012 (KR) .................. 10-2012-00114196

(51) Int. Cl.
*H01M 4/36* (2006.01)
*H01M 4/131* (2010.01)
*H01M 4/48* (2010.01)
*H01M 4/58* (2010.01)

(52) U.S. Cl.
CPC ............ *H01M 4/366* (2013.01); *H01M 4/131* (2013.01); *H01M 4/364* (2013.01); *H01M 4/483* (2013.01); *H01M 4/5825* (2013.01); *Y02E 60/122* (2013.01); *Y02P 70/54* (2015.11)

(58) Field of Classification Search
None
See application file for complete search history.

(56) References Cited

U.S. PATENT DOCUMENTS

| 2007/0166617 A1* | 7/2007 | Gozdz et al. ............ 429/231.95 |
| 2012/0219862 A1* | 8/2012 | Fujino ................. C01B 35/1027 429/231.5 |
| 2013/0052492 A1* | 2/2013 | Schaefer ........................ 429/50 |

FOREIGN PATENT DOCUMENTS

| JP | 2008072003 A | 3/2008 |
| JP | 2010218824 A | 9/2010 |
| KR | 1020020046658 A | 6/2002 |
| KR | 100424674 B1 | 3/2004 |
| WO | WO2011113520 | * 9/2011 |

* cited by examiner

*Primary Examiner* — Patrick Ryan
*Assistant Examiner* — Wyatt McConnell
(74) *Attorney, Agent, or Firm* — Lee & Morse, P.C.

(57) ABSTRACT

A positive active material including: a lithium-containing oxide, and a lithium-intercalatable phosphate compound disposed on the lithium-containing oxide.

21 Claims, 6 Drawing Sheets

POSITIVE ACTIVE MATERIAL, METHOD OF PREPARING THE SAME, AND LITHIUM BATTERY INCLUDING THE POSITIVE ACTIVE MATERIAL

CROSS-REFERENCE TO RELATED APPLICATIONS

This application claims priority to and the benefit of Korean Patent Application No. 10-2012-0114196, filed on Oct. 15, 2012, and all the benefits accruing therefrom under 35 U.S.C. §119, the content of which is incorporated herein by reference.

BACKGROUND

1. Field

The present disclosure relates to a positive active material, a method of preparing the same, and a lithium battery including the positive active material, and more particularly, to a positive active material with improved initial efficiency and high-temperature stability.

2. Description of the Related Art

Lithium batteries, and in particular, lithium ion batteries ("LIBs"), have been used as a power source for portable, information technology ("IT") devices due to high energy densities and ease of design. Recently, with use of lithium ion batteries as a power source for electric vehicles or power storage, research into materials for high-energy density or long-lifespan lithium ion batteries has been performed.

Much research has been performed into high-voltage positive active materials. However, high-voltage positive active materials usually have low initial efficiency and are not safe at high temperatures. Furthermore, high-voltage positive active materials in contact with an electrolyte may lead to side reactions on the surface of the positive active material, which is understood to cause self-discharge during storage at high-temperatures, and reduce high-temperature charging/discharging capacity.

Therefore, there still is a demand for a positive active material that provides improved initial efficiency and stability at high-temperatures while maintaining capacity during charging/discharging at high voltages and high temperatures.

SUMMARY

Provided is a positive active material that improves initial efficiency and high-temperature stability of a lithium battery while maintaining a high capacity thereof.

Provided is a lithium battery including the positive active material.

Provided is a method of preparing the positive active material that improves initial efficiency and high-temperature stability of a lithium battery while maintaining a high capacity thereof.

Additional aspects will be set forth in part in the description which follows and, in part, will be apparent from the description.

According to an aspect of the present disclosure, a positive active material includes: a lithium-containing oxide; and a lithium-intercalatable phosphate compound disposed on the lithium-containing oxide.

The phosphate compound may be a compound represented by Formula 1 below:

MOPO$_4$        Formula 1 wherein, in Formula 1, M may be at least one selected from a transition metal having an ionic diameter of from about 60 angstroms ("Å") to about 90 Å and an oxidation number of +5.

The phosphate compound may include at least one selected from MoOPO$_4$, TiOPO$_4$, VOPO$_4$, TaOPO$_4$, and NbOPO$_4$.

According to another aspect of the present disclosure, a lithium battery includes: a positive electrode; an electrolyte; and a negative electrode, wherein the positive electrode includes the above-described positive active material.

According to another aspect of the present disclosure, a method of preparing a positive active material includes: heating a transition metal precursor to prepare a lithium-intercalatable phosphate compound; and contacting the phosphate compound with a lithium-containing oxide to prepare the positive active material, which includes a mixture of the lithium-containing oxide and the phosphate compound.

According to another aspect of the present disclosure, a method of preparing a positive active material includes: heating a transition metal precursor to prepare a lithium-intercalatable phosphate compound; and forming a coating of the phosphate compound on at least a portion of a surface of a particle of a lithium-containing oxide by a surface-treatment method to prepare the positive active material.

Also disclosed is a positive active material including: a secondary particle including primary particles of a lithium-containing oxide; and a lithium-intercalatable phosphate compound disposed on a surface of the secondary particle.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
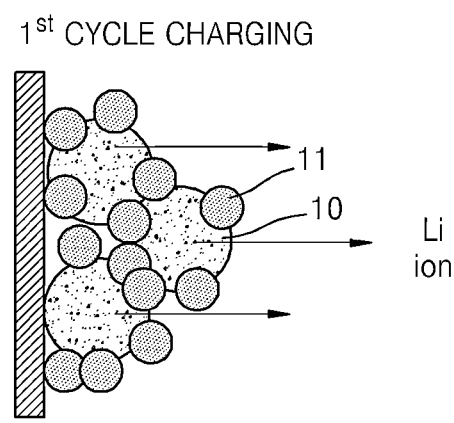
FIG. 1A schematically illustrates an embodiment of a positive active material including a lithium-intercalatable phosphate compound at a 1$^{st}$ charging cycle.

Reference will now be made in detail to embodiments of a positive active material, a method of preparing the same, a lithium battery of the positive active material, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Transition metal" as defined herein refers to an element of Groups 3 to 11 of the Periodic Table of the Elements. Non-limiting examples of transition metals include scandium, titanium, vanadium, chromium, manganese, iron, cobalt, nickel, copper, yttrium, zirconium, niobium, molybdenum, technetium, ruthenium, rhodium, palladium, silver, lanthanum, hafnium, tantalum, tungsten, rhenium, osmium, iridium, platinum, gold, actinium, rutherfordium, dubnium, seaborgium, bohrium, hassium, meitnerium, darmstadtium, and roentgenium.

"Mixture" as used herein is inclusive of all types of combinations, including physical mixtures, blends, alloys, solutions, and the like.

To improve battery performance, a positive active material can be coated with a suitable coating material. Fluorides or metal oxides, such as $Al_2O_3$, MgO, ZnO, $AlF_3$, $ZnF_2$, and $MgF_2$, have been used as coating materials. When used as a coating material, and while not wanting to be bound by theory, it is understood that these coating materials may directly contact an electrolyte when disposed on the surface of the positive electrode to block transfer of electrons, and thus prevent side reactions. Also, it is understood that such coating materials may also help remove undesirable byproducts which can result from charging/discharging of the battery, to avoid deterioration of battery performance.

However, these fluorides or metal oxides are not chargeable or dischargeable, and thus may reduce the capacity of the positive active material. Accordingly, it would be desirable to provide a coating material to provide improved battery performance.

Also, to provide a higher capacity lithium battery, use of a positive active material with higher lithium content than that of currently used positive active materials would be desirable. Such positive active material may be chargeable/dischargeable at a higher voltage for a higher capacity.

Also, lithium batteries may have lower initial efficiency, e.g., irreversible capacity, and poor high-temperature stability in high-voltage conditions, e.g., above 4.2 volts. While not wanting to be bound by theory, it is understood that the reduced stability may be due to a side reaction of an electrolyte contacting the positive active material, and that this may shorten the lifetime of the lithium battery and may reduce the storage performance of the lithium battery.

Therefore, there is a demand for a positive active material that provides improved initial efficiency and high-temperature stability of a lithium battery while maintaining a high capacity thereof.

According to an embodiment, there is provided a positive active material including a lithium-containing oxide; and a lithium-intercalatable phosphate compound disposed on the lithium-containing oxide.

In an embodiment, the lithium-intercalatable phosphate compound may be disposed on a portion or an entirety of a surface of a particle of the lithium-containing oxide. The positive active material may comprise a secondary particle comprising primary particles of the lithium-containing oxide; and the lithium-intercalatable phosphate compound disposed on a surface of the secondary particle of the lithium-containing oxide.

As used herein, "a portion or an entirety of a surface of a particle of the lithium-containing oxide" may means a partial region or entire region of the outer surfaces of a particle of the lithium-containing oxide, a partial or an entire region inside a particle of the lithium-containing oxide, e.g., a region within a pore defined by primary particles of the lithium-containing oxide, or a partial or an entire region of the outer surfaces and inside a particle of the lithium-containing oxide.

The lithium-intercalatable phosphate compound may be disposed on an outer surface of the secondary particle of the lithium-containing oxide, on an inner surface of the secondary particle of the lithium-containing oxide, or a combination thereof. Also, the lithium-intercalatable phosphate compound may be disposed in a pore of the secondary particle of the lithium-containing oxide, wherein the pore is defined by the primary particles of a lithium-containing oxide.

During initial charging and discharging of a lithium battery at a high voltage, lithium ions (Li$^+$) are irreversibly generated, which consequently may lower an initial efficiency of the lithium battery. The initial charging and discharging process of the lithium battery may be represented as Reaction Scheme 1 below:

Reaction Scheme 1

1$^{st}$ charging cycle: Li$_2$MnO$_3$→2Li$^+$+MnO$_2$+½O$_2$

1$^{st}$ discharging cycle: MnO$_2$+2Li$^+$→LiMnO$_2$+Li$^+$     (1)

FIG. 1A includes a schematic illustration of the positive active material comprising lithium-containing oxide particles 10 and the lithium-intercalatable phosphate compound 11 disposed thereon. FIG. 1A schematically illustrated a 1$^{st}$ charging cycle, and shows lithium ion deintercalation from the lithium-containing oxide particles 10.

Figure 1B:
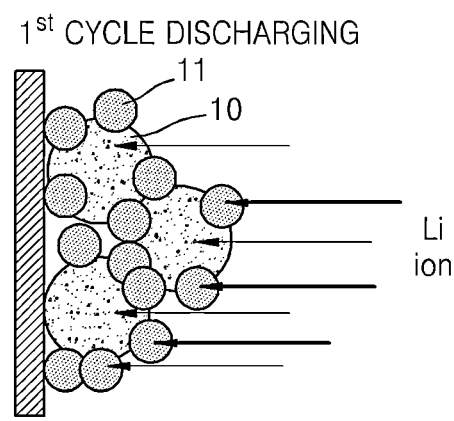
FIG. 1B schematically illustrates an embodiment of a positive active material including a lithium-intercalatable phosphate compound at a 1$^{st}$ discharging cycle.

A 1$^{st}$ discharging cycle is schematically illustrated in FIG. 1B, which shows lithium intercalation into the lithium-containing oxide particles 10 and the lithium-intercalatable phosphate compound 11.

According to an embodiment of the present disclosure and while not wanting to be bound by theory, it is understood that the positive active material including the lithium-intercalatable phosphate compound may accommodate the irreversible lithium ions (Li$^+$), which improves an initial efficiency of a lithium battery. The positive active material may form a strong covalent bond, such as a P—O bond, which consequently may improve high-temperature stability of the lithium battery.

The phosphate compound may include primary particles of the phosphate compound, and may further comprise secondary particles of the phosphate compound, each of which comprises primary particles. The secondary particles may be agglomerated primary particles.

The primary particles of the phosphate compound may have an average particle diameter of from about 0.01 nanometers (nm) to about 1,000 nm, in some embodiments, an average particle diameter of from about 0.01 nm to about 999.99 nm, and in some other embodiments, an average particle diameter of from about 0.01 nm to about 500 nm.

The secondary particles of the phosphate compound may have an average particle diameter of from about 0.01 nm to about 10 micrometers (μm), in some embodiments, an average particle diameter of from about 0.01 nm to about 9.99 μm, and in some other embodiments, an average particle diameter of from about 0.01 nm to about 5 μm.

Figure 2A:
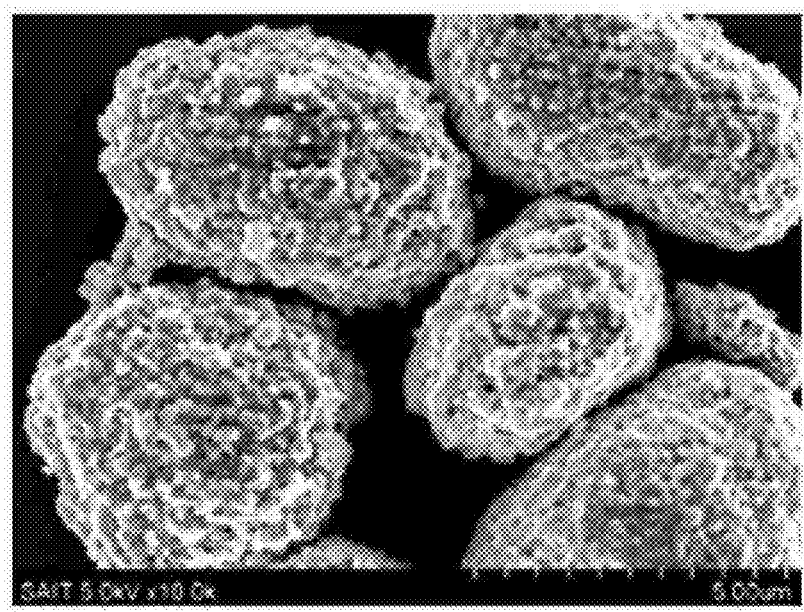
FIG. 2A is a scanning electron micrograph ("SEM") of a positive active material of Example 6 at 10,000× magnification.
Figure 2B:
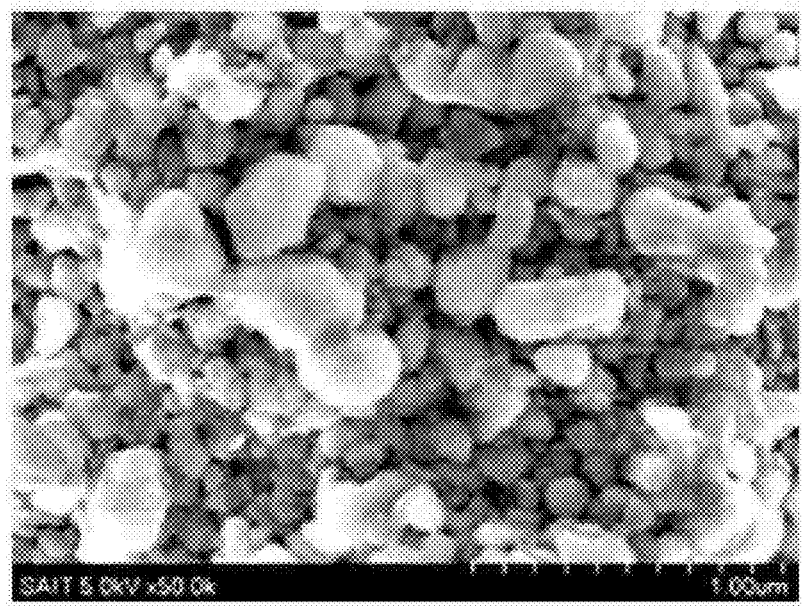
FIG. 2B is a SEM of the positive active material of Example 6 at 50,000× magnification.

The average particle diameters of the primary particles and secondary particles of the lithium-containing oxide and the phosphate compound may be identified from scanning electron micrographs ("SEMs"), as shown in FIGS. 2A and 2B, which are at 10,000× magnification and 50,000× magnification, respectively, of a positive active material prepared in Example 6, which will be described below in further detail. In particular, the average particle diameter of the phosphate compound may be obtained from an average value of measured largest diameters of about 20 primary particles or secondary particles arbitrarily selected from among the primary particles or secondary particles of the phosphate compound in the SEMS.

When the average particle diameter of the phosphate compound is within the foregoing ranges, the phosphate compound may have improved dispersibility, so that a side reaction with the electrolyte may less likely to occur. Due to the presence of strong P—O covalent bonds, the phosphate compound may have improved high-temperature stability, and thus form a positive active material with high energy density.

The phosphate compound may be a compound represented by Formula 1 below:

MOPO$_4$     Formula 1 wherein in Formula 1,

M may be at least one selected from a transition metal having an ionic diameter of from about 60 angstroms (Å) to about 90 Å, specifically about 65 Å to about 85 Å, more specifically about 70 Å to about 80 Å, and an oxidation number of +4.5 or greater, specifically +5.

The phosphate compound may include a transition metal M having an average oxidation number of +4.5 or greater, which is close to the average oxidation number of +5, to form a lithium-intercalatable crystalline structure. Due to the lithium-intercalatable crystalline structure of the phosphate compound, irreversible intercalation of lithium ions generated during a 1$^{st}$ discharge cycle, as illustrated in Reaction Scheme 2 below, into the phosphate compound may be facilitated. Accordingly, a high-capacity lithium battery may be manufactured using the phosphate compound.

The 1$^{st}$ discharge cycle of the phosphate compound is represented by Reaction Scheme 2 below:

Reaction Scheme 2

MOPO$_4$+xLi$^+$→Li$_x$MOPO$_4$ (where 1≤x<2)     (2)

When the oxidation number of M is +5, the ionic diameter in the crystal lattice may be from about 60 Å to about 90 Å, and a dispersibility and stability of a lithium ion in the lattice structure may be improved. Consequently, the lithium battery including the phosphate compound may have improved lifetime.

Non-limiting examples of the phosphate compound are MoOPO$_4$, TiOPO$_4$, VOPO$_4$, TaOPO$_4$, or NbOPO$_4$. In some embodiments, the phosphate compound may be MoOPO$_4$, TiOPO$_4$, or VOPO$_4$. The phosphate compound may have improved characteristics, particularly, with regard to initial efficiency and high-temperature stability of a lithium battery.

The phosphate compound may have a layered structure or a tunneled structure, which is a structure with a weak bond between the transition metal M and oxygen (O), so that irreversible intercalation of lithium ions (Li$^+$) into open spaces between layers or adjacent tunnels may be facilitated, thus improving initial efficiency of the lithium battery.

The phosphate compound may have a single crystalline structure or at least two different crystalline structures. The phosphate compound may have any of a variety of crystalline structures depending on the linkage and arrangement of transition metal oxide structural units and tetrahedral $PO_4$ structural units.

For example, when the phosphate compound is $VOPO_4$, the phosphate compound may have an octahedral $VO_6$ structure unit and at least one crystalline structure selected from an $α_I$ phase, $α_{II}$ phase, β phase, γ phase, δ phase, ε phase, and a ω phase, depending on the linkage and arrangement of octahedral $VO_6$ structural units and tetrahedral $PO_4$ structural units.

An amount of the phosphate compound may be from about 0.001 parts to about 30 parts by weight, and in some embodiments, from about 0.5 parts to about 30 parts by weight, and in some other embodiments, from about 0.5 parts to about 10 parts by weight, based on 100 parts by weight of the lithium-containing oxide. When the amount of the phosphate compound is within the foregoing ranges, a lithium battery manufactured using the positive active material including the phosphate compound may have improved initial efficiency and improved capacity.

The phosphate compound may form a coating on at least a portion of a surface of particles of the lithium-containing oxide. The coating of the phosphate compound may have a uniform distribution on the surfaces of the lithium-containing oxide particles, and the positive active material may have improved thermal stability and further improved high capacity.

The coating may have a thickness of from about 0.01 nm to about 10 μm, in some embodiments, from about 0.01 nm to about 9.99 μm, and in some other embodiments, from about 0.01 nm to about 500 nm. When the thickness of the coating of the phosphate compound is within the foregoing ranges, the positive active material may have a reduced difference in interfacial resistance between the lithium-containing oxide particles and the coating, may be less vulnerable to a side reaction with the electrolyte, and thus may improve the initial efficiency and high-temperature stability of the lithium battery.

An amount of the phosphate compound may be from about 0.001 parts to about 10 parts by weight, in some embodiments, from about 0.001 parts to about 5 parts by weight, and in some other embodiments, from about 0.001 parts to about 2 parts by weight, based on 100 parts by weight of the lithium-containing oxide. When the amount of the phosphate compound is within the foregoing ranges, the positive active material including the coating of the phosphate compound may have further improved initial efficiency and maximized high-temperature stability of the lithium battery.

The lithium-containing oxide particles, e.g., secondary particles, may have an average particle diameter of from about 5 μm to about 15 μm, and in some embodiments, an average particle diameter of from about 7 μm to about 12 μm.

In an embodiment, the primary particles of the lithium-containing oxide may have an average particle diameter of from about 0.01 nanometers (nm) to about 1,000 nm, in some embodiments, an average particle diameter of from about 0.01 nm to about 999.99 nm, and in some other embodiments, an average particle diameter of from about 0.01 nm to about 500 nm.

In an embodiment, the secondary particles of the lithium-containing oxide may have an average particle diameter of from about 5 μm to about 15 μm, and in some embodiments, an average particle diameter of from about 7 μm to about 12 μm.

The lithium-containing oxide particles may comprise at least one compound selected from those represented by Formulas 2 to 5 below:

$$xLi[Li_{1/3}Me_{2/3}]O_2\text{-}(1-x)LiMe'O_2 \qquad \text{Formula 2}$$

wherein in Formula 2, $0<x<0.9$,

Me is at least one element selected from manganese (Mn), molybdenum (Mo), tungsten (W), vanadium (V), titanium (Ti), zirconium (Zr), ruthenium (Ru), rhodium (Rh), palladium (Pd), osmium (Os), iridium (Ir), and platinum (Pt); and Me' is at least one element selected from nickel (Ni), manganese (Mn), and cobalt (Co);

$$yLi[Li_{1/3}((M1)_a(M2)_b(Mn)_c)_{2/3}]O_2\text{-}(1-y)LiMe'O_2 \qquad \text{Formula 3}$$

wherein in Formula 3, $0 \le a \le 1/3$;

b is $0 \le b \le 1/3$;

$a+b+c=1$;

$0<y<0.9$;

M1 is at least one element selected from nickel (Ni), copper (Cu), zinc (Zn), cobalt (Co), chromium (Cr), iron (Fe), and magnesium (Mg); and
M2 is at least one element selected from molybdenum (Mo), tungsten (W), vanadium (V), titanium (Ti), zirconium (Zr), ruthenium (Ru), rhodium (Rh), palladium (Pd), osmium (Os), iridium (Ir), and platinum (Pt);

$$Li_dCo_{1-e-g}Ni_e(M3)_gO_{2-j}(X1)_j \qquad \text{Formula 4}$$

wherein in Formula 4, $0.8<d\le1.6$;

$0\le e\le1$;

$0\le g\le0.5$;

$0\le j\le1$;

M3 is at least one element selected from manganese (Mn), nickel (Ni), cobalt (Co), copper (Cu), magnesium (Mg), sodium (Na), calcium (Ca), titanium (Ti), zinc (Zn), gallium (Ga), germanium (Ge), aluminum (Al), chromium (Cr), magnesium (Mg), strontium (Sr), molybdenum (Mo), tungsten (W), vanadium (V), titanium (Ti), zirconium (Zr), ruthenium (Ru), rhodium (Rh), palladium (Pd), osmium (Os), iridium (Ir), silver (Ag), gold (Au), hafnium (Hf), tin (Sn), and platinum (Pt); and
X1 is at least one element selected from oxygen (O), fluorine (F), sulfur (S), and phosphorous (P);

$$Li_pMn_{2-q}(M4)_qO_{4-t}(X2)_t \qquad \text{Formula 5}$$

wherein in Formula 5, $0.8<p\le1.6$;

$0\le q\le1$;

$0\le t\le1$;

M4 is at least one element selected from manganese (Mn), nickel (Ni), cobalt (Co), copper (Cu), magnesium (Mg), sodium (Na), calcium (Ca), titanium (Ti), zinc (Zn), gallium (Ga), germanium (Ge), aluminum (Al), chromium (Cr), magnesium (Mg), strontium (Sr), molybdenum (Mo), tungsten (W), vanadium (V), titanium (Ti), zirconium (Zr), ruthenium (Ru), rhodium (Rh), palladium (Pd), osmium (Os), iridium (Ir), silver (Ag), gold (Au), hafnium (Hf), tin (Sn), and platinum (Pt); and X2 is at least one element selected from oxygen (O), fluorine (F), sulfur (S), and phosphorous (P).

The lithium-containing oxide may comprise a lithium transition metal oxide including manganese, for example, a lithium manganese oxide, a lithium nickel manganese oxide, or a lithium nickel manganese cobalt oxide. For example, the lithium-containing oxide may be a lithium-rich lithium manganese oxide.

While not wanting to be bound by theory, it is understood that the particles of the lithium-containing oxide on the surface of a positive electrode are at least partially decomposed when contacted with electrolyte, so that a transition metal, such as manganese, may come out of the lithium transition metal oxide. This side reaction may cause self-discharging of the lithium battery during high-temperature storage, and may reduce charge/discharge capacity at high temperatures.

According to the embodiments of the present disclosure, since the lithium-containing oxide is coated with the phosphate compound, the decomposition of the positive active material when in contact with electrolyte at high voltages and/or high temperatures may be substantially or effectively prevented, so that the initial efficiency, high-temperature stability characteristics of the lithium battery may be improved, which consequently improves lifetime characteristics of the lithium battery.

According to another embodiment, there is provided a lithium battery including a positive electrode, an electrolyte, and a negative electrode, wherein the positive electrode includes the above-described active material. The lithium battery may be manufactured as follows.

First, the positive electrode may be manufactured as follows.

A positive active material as described above, i.e., including a lithium-containing oxide and a lithium-intercalatable phosphate compound disposed on the lithium-containing oxide, a conducting agent, a binder, and a solvent are mixed to prepare a positive active material composition. The positive active material composition may be directly coated on an aluminum current collector and dried to form a positive active material layer on a positive electrode plate. Alternatively, the positive active material composition may be cast on a separate support to form a positive active material layer, which is then separated from the support and laminated on an aluminum current collector to prepare a positive electrode plate with the positive active material layer.

In an embodiment, the lithium-containing oxide may have an average particle diameter of from about 5 μm to about 15 μm, and in some embodiments, an average particle diameter of from about 7 μm to about 12 μm.

The lithium-containing oxide may include compounds represented by Formulas 2 to 5:

$$xLi[Li_{1/3}Me_{2/3}]O_2\text{-}(1-x)LiMe'O_2 \quad \text{Formula 2}$$

wherein in Formula 2, $0<x<0.9$,

Me is at least one element selected from manganese (Mn), molybdenum (Mo), tungsten (W), vanadium (V), titanium (Ti), zirconium (Zr), ruthenium (Ru), rhodium (Rh), palladium (Pd), osmium (Os), iridium (Ir), and platinum (Pt); and Me' is at least one element selected from nickel (Ni), manganese (Mn), and cobalt (Co);

$$yLi[Li_{1/3}((M1)_a(M2)_b(Mn)_c)_{2/3}]O_2\text{-}(1-y)LiMe'O_2 \quad \text{Formula 3}$$

wherein in Formula 3, $0 \leq a \leq 1/3$;

$0 \leq b \leq 1/3$;

$a+b+c=1$;

$0<y<0.9$;

M1 is at least one element selected from nickel (Ni), copper (Cu), zinc (Zn), cobalt (Co), chromium (Cr), iron (Fe), and magnesium (Mg); and M2 is at least one element selected from molybdenum (Mo), tungsten (W), vanadium (V), titanium (Ti), zirconium (Zr), ruthenium (Ru), rhodium (Rh), palladium (Pd), osmium (Os), iridium (Ir), and platinum (Pt);

$$Li_dCo_{1-e-g}Ni_e(M3)_gO_{2-j}(X1)_j \quad \text{Formula 4}$$

wherein in Formula 4, $0.8<d\leq 1.6$;

$0\leq e\leq 1$;

$0\leq g\leq 0.5$;

$0\leq j\leq 1$;

M3 is at least one element selected from manganese (Mn), nickel (Ni), cobalt (Co), copper (Cu), magnesium (Mg), sodium (Na), calcium (Ca), titanium (Ti), zinc (Zn), gallium (Ga), germanium (Ge), aluminum (Al), chromium (Cr), magnesium (Mg), strontium (Sr), molybdenum (Mo), tungsten (W), vanadium (V), titanium (Ti), zirconium (Zr), ruthenium (Ru), rhodium (Rh), palladium (Pd), osmium (Os), iridium (Ir), silver (Ag), gold (Au), hafnium (Hf), tin (Sn), and platinum (Pt); and X1 is at least one element selected from oxygen (O), fluorine (F), sulfur (S), and phosphorous (P);

$$Li_pMn_{2-q}(M4)_qO_{4-t}(X2)_t \quad \text{Formula 5}$$

wherein in Formula 5, $0.8<p\leq 1.6$;

$0\leq q\leq 1$;

$0\leq t\leq 1$;

M4 is at least one element selected from manganese (Mn), nickel (Ni), cobalt (Co), copper (Cu), magnesium (Mg), sodium (Na), calcium (Ca), titanium (Ti), zinc (Zn), gallium (Ga), germanium (Ge), aluminum (Al), chromium (Cr), magnesium (Mg), strontium (Sr), molybdenum (Mo), tungsten (W), vanadium (V), titanium (Ti), zirconium (Zr), ruthenium (Ru), rhodium (Rh), palladium (Pd), osmium (Os), iridium (Ir), silver (Ag), gold (Au), hafnium (Hf), tin (Sn), and platinum (Pt); and X2 is at least one element selected from oxygen (O), fluorine (F), sulfur (S), and phosphorous (P).

The phosphate compound may be a compound represented by Formula 1 below:

$$MOPO_4 \quad \text{Formula 1}$$

wherein in Formula 1,

M is at least one selected from a transition metal having an ionic diameter of from about 60 Å to about 90 Å and an oxidation number of +5.

Non-limiting examples of the phosphate compound are $MoOPO_4$, $TiOPO_4$, $VOPO_4$, $TaOPO_4$, or $NbOPO_4$.

An operating voltage, e.g., a charge voltage, of the positive active material may be about 4.3 Volts (V)±0.1 V versus lithium. The positive active material may be a high-voltage positive active material.

Non-limiting examples of the conducting agent include carbons, such as carbon black, activated carbon, graphite particulates, natural graphite, artificial graphite, acetylene black, ketchen black, carbon fibers, carbon nanofibers, carbon nanowires, carbon nanotubes, carbon nanohorns, carbon nanorings, carbon aerogel, carbon cryogel, and mesocarbon microbeads, and metallic materials, such as copper, nickel, aluminum, silver, and the like, which may be in the form of a powder, fiber, or tube, as well as conductive polymers, such as a polyphenylene derivative. Any suitable conducting agent available in the art may be used.

Non-limiting examples of the binder include a vinylidene fluoride/hexafluoropropylene copolymer, polyvinylidene fluoride ("PVDF"), polyacrylonitrile, polymethylmethacrylate, polytetrafluoroethylene, polyvinyl chloride, polyvinyl pyrrolidone, polypropylene, polyvinyl alcohol, carboxymethyl cellulose, hydroxypropyl cellulose, diacetyl cellulose, and a styrene butadiene rubber polymer. A combination comprising at least one of the foregoing binders can be used. Non-limiting examples of the solvent include N-methylpyrrolidone ("NMP"), N,N-dimethylformamide ("DMF"), N,N-dimethylacetamide ("DMA"), dimethylsulfoxide ("DMSO"), dichloromethane, chloroform, toluene, chlorobenzene, methyl acetate, ethyl acetate, γ-butyrolactone, acetone, methyl ethyl ketone, cyclohexanone, ether, 1,2-dimethoxyethane, 1,2-diethoxyethane, tetrahydrofurane, 1,4-dioxane, a chain-type carbonate (such as dimethyl carbonate, ethyl methyl carbonate, diethyl carbonate, and dipropyl carbonate), a cyclic carbonate (such as ethylene carbonate, propylene carbonate, and butylene carbonate), methanol, ethanol, and water. A combination comprising at least one of the foregoing solvents can be used. Any suitable material available for these purposes in the art may be used. The amounts of the positive active material, the conducting agent, the binder, and the solvent may be amounts that are generally used in the manufacture of lithium batteries in the art, and can be determined without undue experimentation.

The positive electrode may further include a second positive active material, in addition to the above-described positive active material. The second positive active material may be any suitable lithium-intercalatable/deintercalatable material used for positive electrodes in the art.

The negative electrode may be manufactured in the same manner as the positive electrode, except that a negative active material, instead of the positive active material, is used.

For example, the negative electrode may be manufactured as follows.

Similarly to the manufacturing of the positive electrode described above, a negative active material, a conducting agent, a binder, and a solvent are mixed to prepare a negative active material composition. The negative active material composition is coated directly on a copper current collector to prepare a negative electrode plate. Alternatively, the negative active material composition may be cast on a separate support to form a negative active material layer, which is then separated from the support and laminated on the copper current collector to obtain a negative electrode plate.

Examples of the negative active material include lithium metal, a metal that is alloyable with lithium, a transition metal oxide, a material that allows doping or undoping of lithium, a material that allows reversible intercalation and deintercalation of lithium ions, and the like.

Examples of the transition metal oxide include vanadium oxide, lithium vanadium oxide, and the like. Examples of the material that allows doping or undoping of lithium include silicon (Si), $SiO_x$ (where $0<x<2$), an Si—Y alloy (where Y is an alkali metal, an alkali earth metal, a Group 13 to 16 element, a transition metal, a rare earth element, or combinations thereof (except for Si), Sn, $SnO_2$, an Sn—Y alloy (where Y is an alkali metal, an alkali earth metal, a Group 13 to 16 element, a transition metal, a rare earth element, or combinations thereof (except for Sn), and combinations of at least one of these materials and $SiO_2$. In an embodiment, the element Y may be at least one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, and Po.

The material that allows reversible intercalation and deintercalation of lithium ions may be any suitable carbonaceous negative active material that is used in lithium ion secondary batteries. Examples include crystalline carbon, amorphous carbon, and combinations thereof. Examples of the crystalline carbon are graphite, such as natural graphite or artificial graphite that are in an amorphous, plate, flake, spherical, or fibrous form. Examples of the amorphous carbon are soft carbon (carbon sintered at low temperatures), hard carbon, meso-phase pitch carbides, sintered corks, and the like.

The negative active material may be any negative active material for a lithium battery available in the art.

The conducting agent, the binder, and the solvent in the negative active material composition may be the same as those used in the positive active material composition. If desired, a plasticizer may be added to each of the negative active material composition and the negative active material composition to incorporate pores in the electrode plates.

The amounts of the negative active material, the conducting agent, the binder, and the solvent may be the amounts generally used in the manufacture of lithium batteries in the art and can be determined without undue experimentation. At least one of the conducting agent, the binder, and the solvent may be omitted if desired.

Next, a separator to be disposed between the positive electrode and the negative electrode is prepared. The separator for the lithium battery may be any suitable separator that is used in lithium batteries. The separator may have low resistance to migration of ions in an electrolyte and have an excellent electrolyte-retaining ability. Non-limiting examples of the separator include glass fiber, polyester, Teflon, polyethylene, polypropylene, polytetrafluoroethylene ("PTFE"), and a combination thereof, each of which may be a non-woven or woven fabric. For example, a windable separator including polyethylene or polypropylene may be used for a lithium ion battery. A separator with suitable ability to retain an organic electrolyte solution may be used for a lithium ion polymer battery. For example, the separator may be manufactured in the following manner.

A polymer resin, a filler, and a solvent may be mixed together to prepare a separator composition. Then, the separator composition may be directly coated on an electrode, and then dried to form the separator. Alternatively, the separator composition may be cast on a support and then dried to form a separator film, which may then be separated from the support and laminated on an electrode to form the separator.

The polymer resin used for manufacturing the separator may be any suitable material that is used as a binder for electrode plates. Non-limiting examples of the polymer resin include a vinylidenefluoride/hexafluoropropylene copolymer, polyvinylidene fluoride ("PVDF"), polyacrylonitrile, polymethylmethacrylate, and a combination thereof.

Next, the electrolyte is prepared.

For example, the electrolyte may be an organic electrolyte solution. Alternatively, the electrolyte may be a solid phase electrolyte. Non-limiting examples of the electrolyte include boron oxide and lithium oxynitride. Any suitable material available as a solid electrolyte in the art may be used. The solid electrolyte may be formed on the negative electrode by, for example, sputtering.

In some embodiments, an organic electrolyte solution may be prepared as follows. The organic electrolyte solution may be prepared by dissolving a lithium salt in an organic solvent.

The organic solvent may be any suitable solvent available in the art. Non-limiting examples of the organic solvent are propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane,N,N-dimethyl formamide ("DMF"), dimethyl acetamide ("DMA"), dimethylsulfoxide ("DMSO"), 1,4-dioxane, 1,2-dimethoxyethane, sulfolane, dichloroethane, chlorobenzene, nitrobenzene, diethylene glycol, dimethyl ether, or combinations thereof.

The lithium salt may be any suitable lithium salt available in the art. Non-limiting examples of the lithium salt include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, LiI, or combinations thereof.

Figure 7:
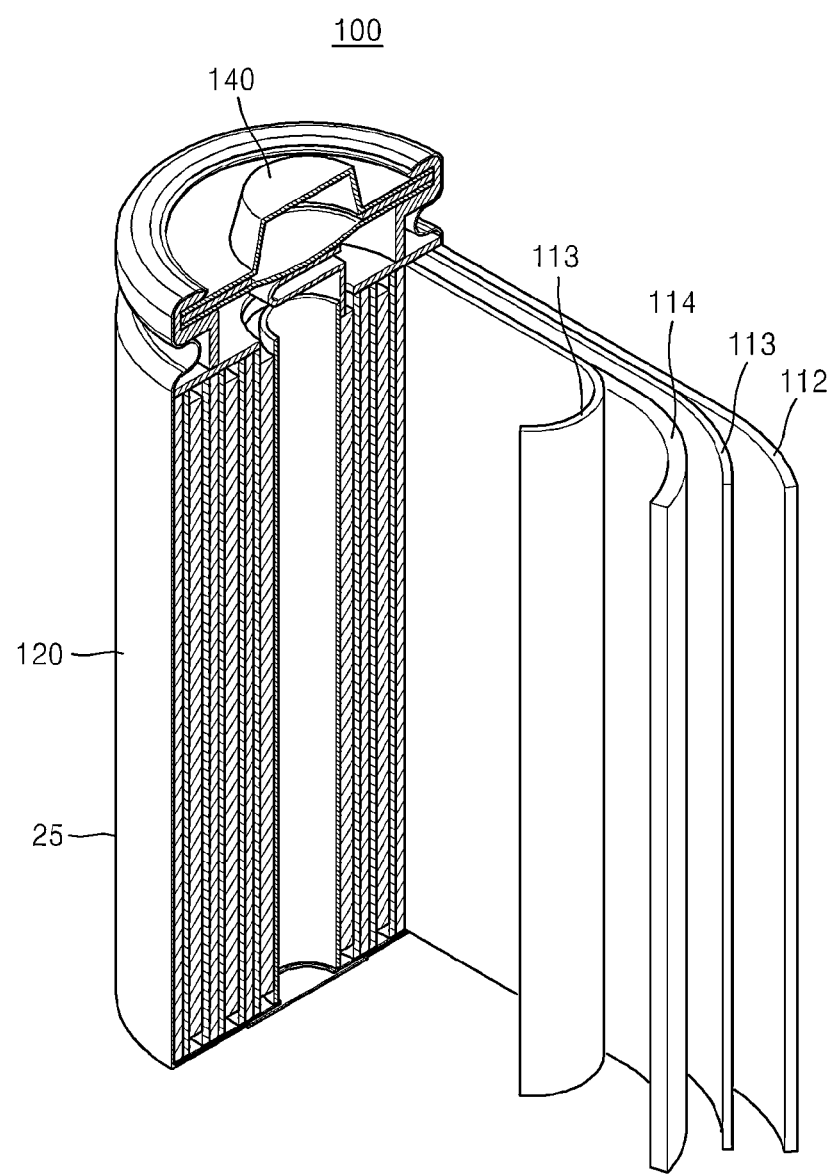
FIG. 7 is an exploded perspective view of an embodiment of a lithium battery.

Referring to FIG. 7, a lithium battery 100 includes a positive electrode 114, a negative electrode 112, and a separator 113. The positive electrode 114, the negative electrode 112, and the separator 113 may be wound or folded, and then accommodated in a battery case 120. Subsequently, an electrolyte is injected into the battery case 120 and the battery case 25 is sealed by a sealing member 140, thereby completing the manufacture of the lithium battery 100. The battery case 25 may be a cylindrical type, a rectangular type, or a thin-film type. The lithium battery 100 may be a large thin-film type lithium ion battery. The lithium battery 100 may be a lithium ion battery.

The separator may be interposed between the positive electrode and the negative electrode to form a battery assembly. The battery assembly may be stacked in a bi-cell structure and impregnated with an organic electrolyte solution. The resulting structure may be put into a pouch and hermetically sealed, thereby completing the manufacture of a lithium ion polymer battery.

Alternatively, a plurality of battery assemblies may be stacked to form a battery pack, which may be used in any device wherein high capacity and high output is desired, for example, in a laptop computer, a smart phone, electric vehicle, and the like.

The lithium battery may have improved high-temperature storage stability, lifetime characteristics, and high-rate characteristics, and thus may be applicable in an electric vehicle ("EV"), for example, in a hybrid vehicle such as plug-in hybrid electric vehicle ("PHEV").

According to another embodiment, there is provided a method of preparing a positive active material, the method including: calcining a transition metal precursor to prepare a lithium-intercalatable phosphate compound; and contacting, e.g., mixing, the lithium-intercalatable phosphate compound with lithium-containing oxide particles to prepare the positive active material to provide a mixture of the lithium-containing oxide particles and the lithium-intercalatable phosphate compound.

The phosphate compound may be a compound represented by Formula 1 below:

$$MOPO_4 \qquad \text{Formula 1}$$

wherein in Formula 1,

M may be at least one selected from transition metals having an ionic diameter of from about 60 Å to about 90 Å and an oxidation number of +5.

The transition metal precursor may be a precursor obtained by refluxing $MoO_2$, $TiO_2$, $V_2O_5$, $Ta_2O_5$, or $Nb_2O_5$ with water and $H_3PO_4$ or $(NH_4)_3PO_4$, for example, $MoOPO_4.2H_2O$, $TiOPO_4.2H_2O$, $VOPO_4.2H_2O$, $VOHPO_4.0.5H_2O$, $VPO_4.H_2O$, $TaOPO_4.3.4H_2O$, $TaOPO_4.2.1H_2O$, $TaOPO_4.2.3H_2O$, $TaOPO_4.1.3H_2O$, or $NbOPO_4.H_2O$. The transition metal precursor may be calcined to obtain the lithium-intercalatable phosphate compound, which may then be ground.

The calcining may be performed at a temperature of from about 500° C. to about 1200° C., in some embodiments, a temperature of from about 600° C. to about 900° C., and in some other embodiments, a temperature of from about 600° C. to about 850° C. The calcining may be performed for about 1 hour to about 24 hours, specifically about 12 hours to about 24 hours. When the calcining temperature and time are within the foregoing ranges, the phosphate compound with a single crystalline structure or at least two different crystalline structures may be obtained.

The calcining may be performed in an inert atmosphere, or/and an oxygen atmosphere. The inert atmosphere for the calcining may be a nitrogen atmosphere, an argon atmosphere, a helium atmosphere, a combination thereof, or in a vacuum.

Next, the phosphate compound may be contacted, e.g., mixed, with lithium-containing oxide to prepare the positive active material as a composite, e.g., a mixture, of the particles of the lithium-containing oxide, and the lithium-intercalatable phosphate compound.

An amount of the phosphate compound may be from about 0.001 parts to about 30 parts by weight, in some embodiments, from about 0.5 parts to about 30 parts by weight, and in some other embodiments, from about 0.5 parts to about 10 parts by weight, based on 100 parts by weight of the lithium-containing oxide. When the amount of the phosphate compound is within the foregoing ranges, a lithium battery using the positive active material may have improved initial efficiency. The contacting, e.g., mixing, may be performed using any method known in the art.

According to another embodiment, there is provided a method of preparing a positive active material, the method including: heating, e.g., calcining, a transition metal precursor to prepare a lithium-intercalatable phosphate compound; and forming a coating of the lithium-intercalatable phosphate compound on at least a portion of particles of the lithium-containing oxide by a surface-treatment method to obtain the positive active material. The surface treatment method may be a dry or a wet surface treatment method.

The preparing of the phosphate compound may be performed in the same manner as in the above-described method.

The dry surface-treatment method may be any suitable method of forming the coating, e.g., by applying mechanical energy to the mixture of the lithium-containing oxide particles and the phosphate compound without using a solvent.

The dry surface-treatment method may include: i) forming a coating by contacting a coating material, for example, the phosphate compound in powder form, onto lithium-containing oxide particle surfaces, for example, using a low-speed ball mill, to be adhered onto the surfaces of the lithium-containing oxide particles and to form phosphate compound agglomerates; ii) forming a coating on surfaces of the lithium-containing oxide particles by operating a grinding medium or a rotor in a coating apparatus so as to dispose coating material particles onto surfaces of the lithium-containing oxide, and at the same time binding the coating material particles onto the lithium-containing oxide particles surfaces by a mechanical force, i.e., the stress of the coating material particles, or by softening or fusing the coating of the coating material particles on the lithium-containing oxide particles using heat generated from the stress of the coating material particles; and iii) thermally treating the lithium-containing oxide particles with the coating formed thereon by the method i) and/or ii) to partially or fully fuse the coating and the lithium-containing oxide particles, and cooling a product from the thermal treatment. However, the dry surface-treatment method is not limited thereto, and any suitable dry surface-treatment method available in the art may be used.

The dry surface-treatment method may be selected from planetary ball milling, low-speed ball milling, high-speed ball milling, hybridization, and mechanofusion. For example, the dry surface-treatment method may be mechanofusion. Mechanofusion is similar to the above method ii), and may involve, for example, fixing a mixture onto an inner wall of a rotating container by centrifugal force, and adhering the mixture to the inner wall and then pressing the mixture through a gap with an arm head placed near the inner wall of the container with a small gap.

After completion of the dry surface-treatment, an additional heat treatment process may be avoided if desired. In some embodiments, an additional heat treatment may be performed after the dry surface-treatment, if desired. The heat treatment may enhance adhesion between the phosphate compound and the lithium-containing oxide particles, and may remove impurities so that the coating may become stronger. The thermal treatment condition may be determined so as to partially or fully dissolve the coating.

The wet surface-treatment method may include spraying, co-precipitation, or dipping, but is not limited thereto. Any wet surface-treatment method known in the art may be used. The wet surface-treatment method may be followed by an additional process, such as drying and grinding.

The coating may have a thickness of from about 0.01 nm to about 9.99 μm, in some embodiments, a thickness of from about 0.01 nm to about 9.9 μm, and in some other embodiments, may be from about 0.01 nm to about 5 μm. When the thickness of the coating is within the foregoing ranges, the positive active material including the coating of the phosphate compound may have a reduced difference in interfacial resistance between the lithium-containing oxide particles and the coating. The positive active material may also be less vulnerable to a side reaction with the electrolyte, and thus may better improve the initial efficiency and high-temperature stability of the lithium battery.

An amount of the phosphate compound may be from about 0.001 parts to about 10 parts by weight, and in some embodiments, from about 0.001 parts to about 5 parts by weight, and in some other embodiments, from about 0.001 parts to about 2 parts by weight, based on 100 parts by weight of the lithium-containing oxide particles. When the amount of the phosphate compound is within the foregoing ranges, the positive active material including the coating of the phosphate compound may have further improved initial efficiency and high-temperature stability of the lithium battery.

The lithium-containing oxide particles may have an average particle diameter of from about 5 μm to about 15 μm, and in some embodiments, an average particle diameter of from about 7 μm to about 12 μm.

The lithium-containing oxide particles may include compounds represented by Formulas 2 to 5 below:

$$x\text{Li}[\text{Li}_{1/3}\text{Me}_{2/3}]\text{O}_2\text{-}(1-x)\text{LiMe'O}_2 \quad \text{Formula 2}$$

wherein in Formula 2, $0<x<0.9$,

Me is at least one element selected from manganese (Mn), molybdenum (Mo), tungsten (W), vanadium (V), titanium (Ti), zirconium (Zr), ruthenium (Ru), rhodium (Rh), palladium (Pd), osmium (Os), iridium (Ir), and platinum (Pt); and Me' is at least one element selected from nickel (Ni), manganese (Mn), and cobalt (Co);

$$y\text{Li}[\text{Li}_{1/3}((\text{M1})_a(\text{M2})_b(\text{Mn})_c)_{2/3}]\text{O}_2\text{-}(1-y)\text{LiMe'O}_2 \quad \text{Formula 3}$$

wherein in Formula 3, $0 \le a \le 1/3$;

$0 \le b \le 1/3$;

$a+b+c=1$;

$0<y<0.9$;

M1 is at least one element selected from nickel (Ni), copper (Cu), zinc (Zn), cobalt (Co), chromium (Cr), iron (Fe), and magnesium (Mg); and
M2 is at least one element selected from molybdenum (Mo), tungsten (W), vanadium (V), titanium (Ti), zirconium (Zr), ruthenium (Ru), rhodium (Rh), palladium (Pd), osmium (Os), iridium (Ir), and platinum (Pt);

$$\text{Li}_d\text{Co}_{1-e-g}\text{Ni}_e(\text{M3})_g\text{O}_{2-j}(\text{X1})_j \quad \text{Formula 4}$$

wherein in Formula 4, $0.8<d \le 1.6$;

$0 \le e \le 1$;

$0 \le g \le 0.5$;

$0 \le j \le 1$;

M3 is at least one element selected from manganese (Mn), nickel (Ni), cobalt (Co), copper (Cu), magnesium (Mg), sodium (Na), calcium (Ca), titanium (Ti), zinc (Zn), gallium (Ga), germanium (Ge), aluminum (Al), chromium (Cr), magnesium (Mg), strontium (Sr), molybdenum (Mo), tungsten (W), vanadium (V), titanium (Ti), zirconium (Zr), ruthenium (Ru), rhodium (Rh), palladium (Pd), osmium (Os), iridium (Ir), silver (Ag), gold (Au), hafnium (Hf), tin (Sn), and platinum (Pt); and
X1 is at least one element selected from oxygen (O), fluorine (F), sulfur (S), and phosphorous (P);

$$\text{Li}_p\text{Mn}_{2-q}(\text{M4})_q\text{O}_{4-t}(\text{X2})_t \quad \text{Formula 5}$$

wherein in Formula 5, $0.8 < p \leq 1.6;$ $0 \leq q \leq 1;$ $0 \leq t \leq 1;$

M4 is at least one element selected from manganese (Mn), nickel (Ni), cobalt (Co), copper (Cu), magnesium (Mg), sodium (Na), calcium (Ca), titanium (Ti), zinc (Zn), gallium (Ga), germanium (Ge), aluminum (Al), chromium (Cr), magnesium (Mg), strontium (Sr), molybdenum (Mo), tungsten (W), vanadium (V), titanium (Ti), zirconium (Zr), ruthenium (Ru), rhodium (Rh), palladium (Pd), osmium (Os), iridium (Ir), silver (Ag), gold (Au), hafnium (Hf), tin (Sn), and platinum (Pt); and X2 is at least one element selected from oxygen (O), fluorine (F), sulfur (S), and phosphorous (P).

The lithium-containing oxide particles may be a lithium transition metal oxide including manganese, for example, a lithium manganese oxide, a lithium nickel manganese oxide, or a lithium nickel manganese cobalt oxide. For example, the lithium-containing oxide may be a lithium-rich lithium manganese oxide.

One or more embodiments of the present disclosure will now be described in further detail with reference to the following examples. However, these examples shall not limit the scope of embodiments of the present disclosure. Technical descriptions that could be determined by one of ordinary skill in the art without undue experimentation will be omitted herein.

EXAMPLES

Preparation of Positive Active Material

Example 1

Positive Active Material as Mixture of Lithium-Containing Oxide Particles and Lithium-Intercalatable Phosphate Compound A 2 molar (M) nickel sulfate aqueous solution ($NiSO_4 \cdot 6H_2O$, available from Aldrich), a 2M cobalt sulfate aqueous solution ($CoSO_4 \cdot 7H_2O$, available from Aldrich), and a 2M manganese sulfate aqueous solution ($MnSO_4 \cdot xH_2O$, available from Aldrich) were prepared. Afterward, the nickel sulfate aqueous solution, the cobalt sulfate aqueous solution, and the manganese sulfate aqueous solution were mixed to obtain a mixed solution with a mole ratio of nickel, cobalt, and manganese of 0.17:0.1:0.56. The mixed solution was added into 4 liter (L) of a 0.2M $NH_4OH$ solution along with a 2M $Na_2CO_3$ aqueous solution at a rate of 3 milliliters per minute (mL/min), and was allowed to react for about 10 hours while being maintained at pH 8, and then filtered to obtain a precipitate, which was then washed with water and dried. The resulting product was mixed with $Li_2CO_3$ (available from Aldrich) to have a mole ratio of Li:Ni:Co:Mn of 1.18:0.17:0.1:0.56, and thermally treated at about 950° C. for about 5 hours in air to obtain $Li_{1.18}Ni_{0.17}Co_{0.1}Mn_{0.56}O_2$ as a lithium-containing oxide.

$VOPO_4 \cdot 2H_2O$ was refluxed using isobutanol at about 374 K for about 18 hours to obtain $VOHPO_4 \cdot 0.5H_2O$, which was then calcined in the air at about 773 K for about 14 hours to obtain a δ-phase $VOPO_4$.

Afterwards, the $Li_{1.18}Ni_{0.17}CO_{0.1}Mn_{0.56}O_2$ particles, and 0.5 parts by weight of the δ-phase $VOPO_4$ based on 100 parts by weight of the $Li_{1.18}Ni_{0.17}CO_{0.1}Mn_{0.56}O_2$ particles were mixed together using a mortar to prepare a positive active material as a mixture of the $Li_{1.18}Ni_{0.17}Co_{0.1}Mn_{0.56}O_2$ particles having an average particle diameter of about 10 μm and the δ-phase $VOPO_4$ having an average particle diameter of about 500 nm.

Example 2

Positive Active Material as Mixture of Lithium-Containing Oxide Particles and Lithium-Intercalatable Phosphate Compound A positive active material was prepared in the same manner as in Example 1, except that 3 parts by weight of the δ-phase $VOPO_4$, instead of 0.5 parts by weight of the δ-phase $VOPO_4$, based on 100 parts by weight of the $Li_{1.18}Ni_{0.17}Co_{0.1}Mn_{0.56}O_2$ particles, was mixed together with the $Li_{1.18}Ni_{0.17}Co_{0.1}Mn_{0.56}O_2$ particles using a mortar.

Example 3

Positive Active Material as Mixture of Lithium-Containing Oxide Particles and Lithium-Intercalatable Phosphate Compound A positive active material was prepared in the same manner as in Example 1, except that 10 parts by weight of the δ-phase $VOPO_4$, instead of 0.5 parts by weight of the δ-phase $VOPO_4$, based on 100 parts by weight of the $Li_{1.18}Ni_{0.17}Co_{0.1}Mn_{0.56}O_2$ particles, was mixed together with the $Li_{1.18}Ni_{0.17}Co_{0.1}Mn_{0.56}O_2$ particles using a mortar.

Example 4

Positive Active Material as Mixture of Lithium-Containing Oxide Particles and Lithium-Intercalatable Phosphate Compound A positive active material was prepared in the same manner as in Example 1, except that 20 parts by weight of the δ-phase $VOPO_4$, instead of 0.5 parts by weight of the δ-phase $VOPO_4$, based on 100 parts by weight of the $Li_{1.18}Ni_{0.17}Co_{0.1}Mn_{0.56}O_2$ particles, was mixed together with the $Li_{1.18}Ni_{0.17}Co_{0.1}Mn_{0.56}O_2$ particles using a mortar.

Example 5

Positive Active Material as Mixture of Lithium-Containing Oxide Particles and Lithium-Intercalatable Phosphate Compound A positive active material was prepared in the same manner as in Example 1, except that 30 parts by weight of the δ-phase $VOPO_4$, instead of 0.5 parts by weight of the δ-phase $VOPO_4$, based on 100 parts by weight of the $Li_{1.18}Ni_{0.17}Co_{0.1}Mn_{0.56}O_2$ particles, was mixed together with the $Li_{1.18}Ni_{0.17}Co_{0.1}Mn_{0.56}O_2$ particles using a mortar.

Example 6

Positive Active Material with Coating of Lithium-Intercalatable Phosphate Compound on Lithium-Containing Oxide Particle Surfaces A 2M nickel sulfate aqueous solution ($NiSO_4 \cdot 6H_2O$, available from Aldrich), a 2M cobalt sulfate aqueous solution ($CoSO_4 \cdot 7H_2O$), available from Aldrich), and a 2M manganese sulfate aqueous solution ($MnSO_4 \cdot xH_2O$), available from Aldrich) were prepared. Afterward, the nickel sulfate aqueous solution, the cobalt sulfate aqueous solution, and the manganese sulfate aqueous solution were mixed to obtain a mixed solution with a mole ratio of nickel, cobalt, and manganese of 0.17:0.1:0.56. The mixed solution was put into 4 L of a 0.2M $NH_4OH$ solution along with a 2M $Na_2CO_3$ aqueous solution at a rate of 3 mL/min, reacted together for about 10 hours while being maintained at pH 8, and then filtered to obtain a precipitate, which was then washed with water and dried. The resulting product was mixed with $Li_2CO_3$ (available from Aldrich) to have a mole ratio of Li:Ni:Co:Mn of 1.18:0.17:0.1:0.56, and thermally treated at about 950° C. for about 5 hours in air to obtain $Li_{1.18}Ni_{0.17}Co_{0.1}Mn_{0.56}O_2$ as a lithium-containing oxide.

$VOPO_4 \cdot 2H_2O$ was refluxed using iso-butanol at about 374 K for about 18 hours to obtain $VOHPO_4 \cdot 0.5H_2O$, which was then calcined in the air at about 773 K for about 14 hours to obtain a δ-phase $VOPO_4$.

Afterwards, the $Li_{1.18}Ni_{0.17}Co_{0.1}Mn_{0.56}O_2$ particles, and 0.5 parts by weight of the δ-phase $VOPO_4$ based on 100 parts by weight of the $Li_{1.18}Ni_{0.17}Co_{0.1}Mn_{0.56}O_2$ particles were put into a Nobilta NOB-MINI powder processor (available from Hosokawa), and subjected to a dry surface-treatment at about 3,000 revolutions per minute ("RPM") for about 5 minutes to prepare a positive active material with a coating of the δ-phase $VOPO_4$ having an average particle diameter of about 500 nm on surfaces of the $Li_{1.18}Ni_{0.17}Co_{0.1}Mn_{0.56}O_2$ particles.

Example 7

Positive Active Material with Coating of Lithium-Intercalatable Phosphate Compound on Lithium-Containing Oxide Particle Surfaces A 2M nickel sulfate aqueous solution ($NiSO_4 \cdot 6H_2O$), available from Aldrich), a 2M cobalt sulfate aqueous solution ($CoSO_4 \cdot 7H_2O$), available from Aldrich), and a 2M manganese sulfate aqueous solution ($MnSO_4 \cdot xH_2O$), available from Aldrich) were prepared. Afterward, the nickel sulfate aqueous solution, the cobalt sulfate aqueous solution, and the manganese sulfate aqueous solution were mixed to obtain a mixed solution with a mole ratio of nickel, cobalt, and manganese of 0.17:0.1:0.56. The mixed solution was put into 4 L of a 0.2M $NH_4OH$ solution along with a 2M $Na_2CO_3$ aqueous solution at a rate of 3 mL/min, and was allowed to react for about 10 hours while being maintained at pH 8, and then filtered to obtain a precipitate, which was then washed with water and dried. The resulting product was mixed with $Li_2CO_3$ (available from Aldrich) to have a mole ratio of Li:Ni:Co:Mn of 1.18:0.17:0.1:0.56, and thermally treated at about 950° C. for about 5 hours in air to obtain $Li_{1.18}Ni_{0.17}Co_{0.1}Mn_{0.56}O_2$ as a lithium-containing oxide.

$VOPO_4 \cdot 2H_2O$ was refluxed using iso-butanol at about 374 K for about 18 hours to obtain $VOHPO_4 \cdot 0.5H_2O$, which was then calcined in the air at about 773 K for about 14 hours to obtain a δ-phase $VOPO_4$.

Afterwards, the $Li_{1.18}Ni_{0.17}Co_{0.1}Mn_{0.56}O_2$ particles, and 1 part by weight of the δ-phase $VOPO_4$ based on 100 parts by weight of the $Li_{1.18}Ni_{0.17}Co_{0.1}Mn_{0.56}O_2$ particles were put into a Nobilta NOB-MINI (available from Hosokawa), and subjected to a dry surface-treatment at about 3,000 RPM for about 5 minutes to prepare a positive active material with a coating of the δ-phase $VOPO_4$ having an average particle diameter of about 500 nm on surfaces of the $Li_{1.18}Ni_{0.17}Co_{0.1}Mn_{0.56}O_2$ particles.

Example 8

Positive Active Material with Coating of Lithium-Intercalatable Phosphate Compound on Lithium-Containing Oxide Particle Surfaces A 2M nickel sulfate aqueous solution ($NiSO_4 \cdot 6H_2O$), available from Aldrich), a 2M cobalt sulfate aqueous solution ($CoSO_4 \cdot 7H_2O$), available from Aldrich), and a 2M manganese sulfate aqueous solution ($MnSO_4 \cdot xH_2O$), available from Aldrich) were prepared. Afterward, the nickel sulfate aqueous solution, the cobalt sulfate aqueous solution, and the manganese sulfate aqueous solution were mixed to obtain a mixed solution with a mole ratio of nickel, cobalt, and manganese of 0.17:0.1:0.56. The mixed solution was put into 4 L of a 0.2M $NH_4OH$ solution along with a 2M $Na_2CO_3$ aqueous solution at a rate of 3 mL/min, and was allowed to react for about 10 hours while being maintained at pH 8, and then filtered to obtain a precipitate, which was then washed with water and dried. The resulting product was mixed with $Li_2CO_3$ (available from Aldrich) to have a mole ratio of Li:Ni:Co:Mn of 1.18:0.17:0.1:0.56, and thermally treated at about 950° C. for about 5 hours in air to obtain $Li_{1.18}Ni_{0.17}Co_{0.1}Mn_{0.56}O_2$ as a lithium-containing oxide.

$VOPO_4 \cdot 2H_2O$ was refluxed using iso-butanol at about 374 K for about 18 hours to obtain $VOHPO_4 \cdot 0.5H_2O$, which was then calcined in the air at about 773 K for about 14 hours to obtain a δ-phase $VOPO_4$.

Afterwards, the $Li_{1.18}Ni_{0.17}Co_{0.1}Mn_{0.56}O_2$ particles, and 2 parts by weight of the δ-phase $VOPO_4$ based on 100 parts by weight of the $Li_{1.18}Ni_{0.17}Co_{0.1}Mn_{0.56}O_2$ particles were put into a Nobilta NOB-MINI (available from Hosokawa), and subjected to a dry surface-treatment at about 3,000 rpm for about 5 minutes to prepare a positive active material with a coating of the δ-phase $VOPO_4$ having an average particle diameter of about 500 nm on surfaces of the $Li_{1.18}Ni_{0.17}Co_{0.1}Mn_{0.56}O_2$ particles.

Comparative Example 1

Positive Active Material Including Lithium-Containing Composite Oxide Particles A 2M nickel sulfate aqueous solution ($NiSO_4 \cdot 6H_2O$), available from Aldrich), a 2M cobalt sulfate aqueous solution ($CoSO_4 \cdot 7H_2O$), available from Aldrich), and a 2M manganese sulfate aqueous solution ($MnSO_4 \cdot xH_2O$), available from Aldrich) were prepared. Afterward, the nickel sulfate aqueous solution, the cobalt sulfate aqueous solution, and the manganese sulfate aqueous solution were mixed to obtain a mixed solution with have a mole ratio of nickel, cobalt, and manganese of 0.17:0.1:0.56. The mixed solution was added into 4 L of a 0.2M $NH_4OH$ solution along with a 2M $Na_2CO_3$ aqueous solution at a rate of 3 mL/min, and was allowed to react for about 10 hours while being maintained at pH 8, filtered to obtain a precipitate, which was then washed with water and dried. The resulting product was mixed with $Li_2CO_3$ (available from Aldrich) to have a mole ratio of Li:Ni:Co:Mn of 1.18:0.17:0.1:0.56, and thermally treated at about 950° C. for about 5 hours in air, followed by being grinded to prepare a positive active material including $Li_{1.18}Ni_{0.17}Co_{0.1}Mn_{0.56}O_2$ as a lithium-containing oxide having an average particle diameter of about 10 μm.

Comparative Example 2

Positive Active Material Including Lithium-Intercalatable Phosphate Compound $VOPO_4.2H_2O$ was refluxed using iso-butanol at about 374 K for about 18 hours to obtain $VOHPO_4.0.5H_2O$, which was then calcined in the air at about 773 K for about 14 hours to obtain a δ-phase $VOPO_4$ as a positive active material.

Comparative Example 3

Positive Active Material with Coating of Lithium-Intercalatable Phosphate Compound on Lithium-Containing Oxide Particle Surfaces A 2M nickel sulfate aqueous solution ($NiSO_4.6H_2O$, available from Aldrich), a 2M cobalt sulfate aqueous solution ($CoSO_4.7H_2O$, available from Aldrich), and a 2M manganese sulfate aqueous solution ($MnSO_4.xH_2O$, available from Aldrich) were prepared. Afterward, the nickel sulfate aqueous solution, the cobalt sulfate aqueous solution, and the manganese sulfate aqueous solution were mixed to obtain a mixed solution with a mole ratio of nickel, cobalt, and manganese of 0.17:0.1:0.56. The mixed solution was put into 4 L of a 0.2M $NH_4OH$ solution along with a 2M $Na_2CO_3$ aqueous solution at a rate of 3 mL/min, was allowed to react for about 10 hours while being maintained at pH 8, and then filtered to obtain a precipitate, which was then washed with water and dried. The resulting product was mixed with $Li_2CO_3$ (available from Aldrich) to have a mole ratio of Li:Ni:Co:Mn of 1.18:0.17:0.1:0.56, and thermally treated at about 950° C. for about 5 hours in air to obtain $Li_{1.18}Ni_{0.17}Co_{0.1}Mn_{0.56}O_2$ as a lithium-containing oxide.

$VOPO_4.2H_2O$ was refluxed using iso-butanol at about 374 K for about 18 hours to obtain $VOHPO_4.0.5H_2O$, which was then calcined in the air at about 773 K for about 14 hours to obtain a δ-phase $VOPO_4$.

Afterwards, the $Li_{1.18}Ni_{0.17}Co_{0.1}Mn_{0.56}O_2$ particles, and 20 parts by weight of the δ-phase $VOPO_4$ based on 100 parts by weight of the $Li_{1.18}Ni_{0.17}Co_{0.1}Mn_{0.56}O_2$ particles were put into a Nobilta NOB-MINI (available from Hosokawa), and subjected to a dry surface-treatment at about 3,000 RPM for about 5 minutes to prepare a positive active material with a coating of the δ-phase $VOPO_4$ having an average particle diameter of about 500 nm on surfaces of the $Li_{1.18}Ni_{0.17}Co_{0.1}Mn_{0.56}O_2$ particles.

Manufacture of Positive Electrodes

Example 9

Positive Electrode

The positive active material of Example 1, a binder of 3 percent by weight ("wt %") polyvinylidene fluoride ("PVdF") dissolved in N-methylpyrrolidone ("NMP"), and a conducting agent (acetylene black, Denka black) were mixed in a weight ratio of 94:3:3 using a mortar to prepare a slurry, which was then coated on an aluminum foil having a thickness of about 15 µm by bar coating. The resulting coating was dried in a 90° C. oven for about 2 hours to evaporate NMP (first drying), and then in a 120° C. vacuum oven for about 2 hours (second drying) until the NMP was fully evaporated. The resulting product was roll-pressed and punched into a positive electrode for a 60 µm-thick coin cell. The positive electrode had a capacity of about 1.7 milliampere-hours per square centimeter ("mAh/cm$^2$") and a thickness of about 50~60 µm.

Examples 10-16

Positive Electrodes

Positive electrodes for coin cells were manufactured in the same manner as in Example 9, except that the positive active materials of Examples 2 to 8, instead of the positive active material of Example 1, were used, respectively.

Comparative Examples 4-6

Positive Electrodes

Positive electrodes for coin cells were manufactured in the same manner as in Example 9, except that the positive active materials of Comparative Examples 1 to 3, instead of the positive active material of Example 1, were used, respectively.

Manufacture of Lithium Batteries

Example 17

Lithium Battery

A coin cell was manufactured using the positive electrode of Example 9 having a diameter of about 1.5 centimeters (cm), a graphite negative electrode having a diameter of about 1.6 cm, an electrolyte dissolved 1.3M of $LiPF_6$ lithium salt in a mixture of ethylene carbonate, diethyl carbonate, and ethylmethyl carbonate (EC/DEC/EMC=3:5:2 by volume), and a polyethylene separator.

Examples 18-24

Lithium Batteries

Coin cells were manufactured in the same manner as in Example 17, except that the positive electrodes for coin cells manufactured in Examples 10 to 16, instead of the positive electrode of Example 9, were used, respectively.

Comparative Examples 7-9

Lithium Batteries

Coin cells were manufactured in the same manner as in Example 17, except that the positive electrodes for coin cells manufactured in Comparative Examples 4 to 6, instead of the positive electrode of Example 9, were used, respectively.

Analysis of Positive Active Materials

Analysis Example 1

Scanning Electron Microscope Analysis

A surface of the positive active material of Example 6 was observed using a scanning electron microscope (SEM, Model No. S-5500, available from Hitachi) at a magnification of 10,000× and a magnification of 50,000×. The results are shown in FIGS. 2A and 2B, respectively.

Referring to FIGS. 2A and 2B, the positive active material of Example 6 was found to have a coating having a thickness of about 999.99 nm on the surface thereof.

Analysis Example 2

X-Ray Diffraction ("XRD") Analysis

Figure 3:
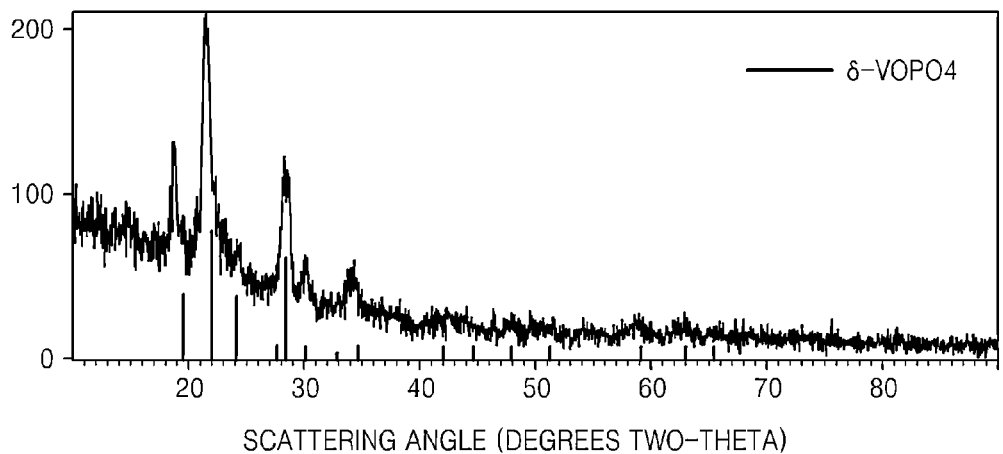
FIG. 3 is an X-ray diffraction ("XRD") pattern representing crystalline structures of positive active materials of Examples 1 to 8 and Comparative Example 2.

Surfaces of the positive active materials of Examples 1 to 8 and Comparative Example 2 were analyzed by XRD. The results are shown in FIG. 3. The XRD was performed using Cu-Kα radiation.

Referring to FIG. 3, the positive active materials of Examples 1 to 8 and Comparative Example 2 were found to exhibit peaks characteristic of a δ-phase $VOPO_4$ structure.

Analysis Example 3

X-Ray Photoelectron Spectroscopic ("XPS") Analysis

With a metal plate with a double-sided tape attached thereon, each of the positive active materials included in the positive electrodes of Examples 14 to 16 and Comparative Example 4 was scattered onto the exposed side of the tape to be thick enough to cover the entire exposed side, followed by surface planarization and pressing. The metal plate with the positive active material was fixed by a holder.

XPS was performed using an XPS meter (Quantum 2000 Scanning ESCA Microprobe, available from Physical Electronics Inc.) under monochromic Al-Kα radiation (1486.6 electron Volts (eV), 27.7 Watts (W), measurement area: 0.2 millimeters (mm), and take-off angle: 45 degrees) as a light source to obtain P2p, V2p3, and Mn2p core level spectra, which were then analyzed to obtain concentrations of Mn, $PO_4$, and $VOPO_4$ on the surfaces of the positive electrodes of Examples 14 to 16 and Comparative Example 4 via integration and division by a separate sensitivity factor. The results are shown in FIGS. 4A, 4B, and 4C, and Table 1 below, in which "atm %" refers to atomic percent.

TABLE 1

| Example | P2p concentration (atm %) | V2p3 concentration (atm %) | Mn2p concentration (atm %) |
|---|---|---|---|
| Example 14 | 1.00 | 0.87 | 17.27 |
| Example 15 | 3.11 | 2.13 | 14.66 |
| Example 16 | 5.50 | 4.12 | 9.72 |
| Comparative Example 4 | 0.00 | 0.00 | 19.72 |

Figure 4A:
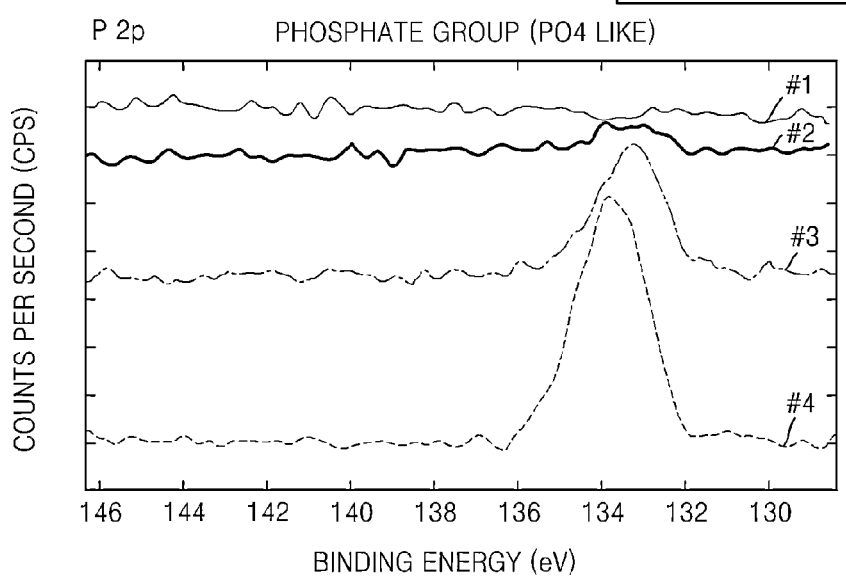
FIG. 4A illustrates P2p core level spectra obtained from surfaces of positive electrodes of Examples 14 to 16 and Comparative Example 4 by X-ray photoelectron spectroscopy ("XPS")
Figure 4B:
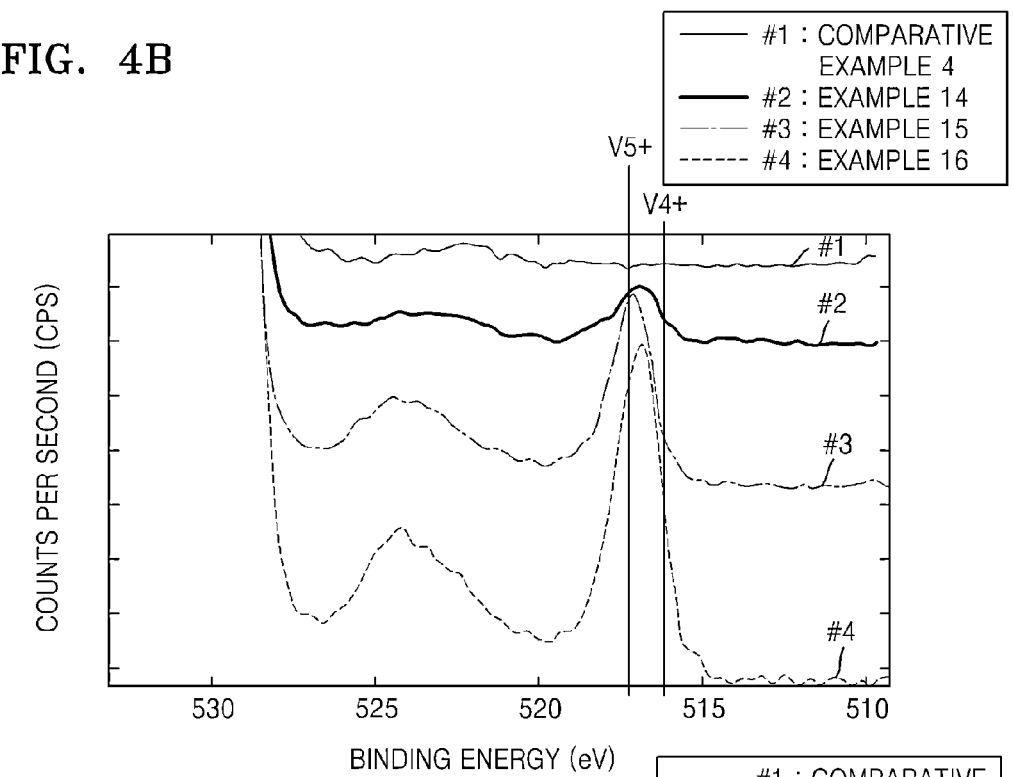
FIG. 4B illustrates V2p3 core level spectra obtained from the surfaces of the positive electrodes of Examples 14 to 16 and Comparative Example 4 by XPS.
Figure 4C:
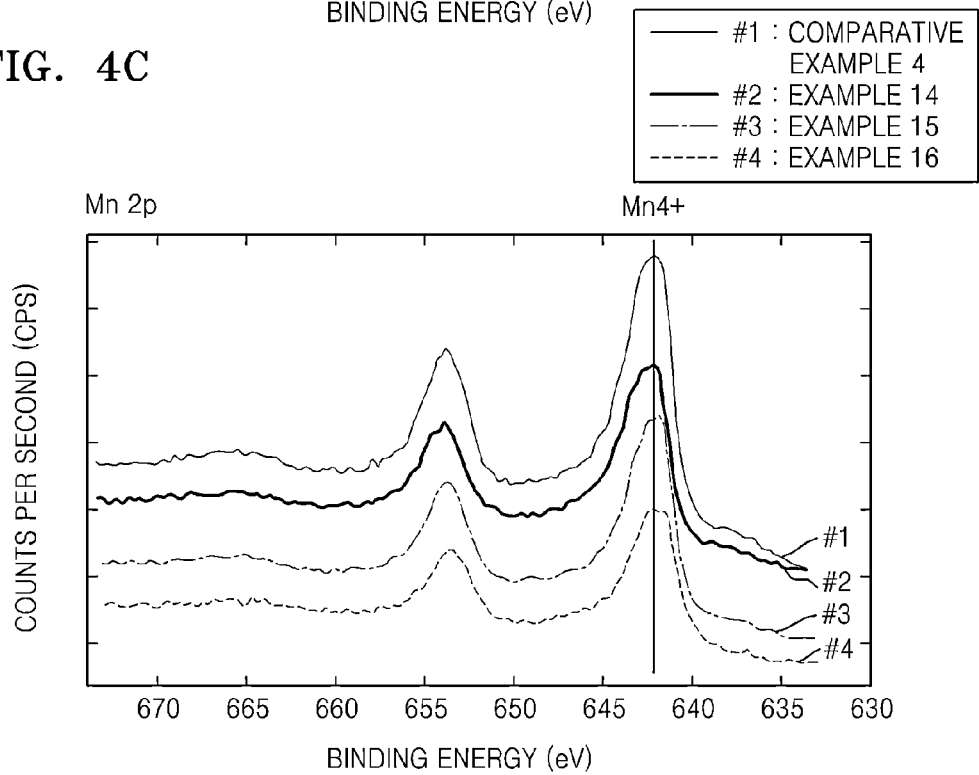
FIG. 4C illustrates Mn2p core level spectra obtained from the surfaces of the positive electrodes of Examples 14 to 16 and Comparative Example 4 by XPS.

Referring to FIGS. 4A, 4B, 4C, and Table 1 above, the positive electrodes of Examples 14 to 16 were found to have gradually increasing concentration of P2p and V2p3 and decreasing concentration of Mn2p with increases in $VOPO_4$ concentration on the surfaces thereof, which indicates the formation of the $VOPO_4$ coating on the surfaces of the positive electrodes. Meanwhile, P2p and V2p3 concentrations on the surface of the surface of the positive electrode of Comparative Example 4 were 0 atm %.

Evaluation of Battery Characteristics

Evaluation Example 1

Initial Efficiency Evaluation

Formation charging/discharging was performed twice on the coin cells of Examples 17-22 and Comparative Examples 7-9 at room temperature. In a first formation process constant-current charging was performed on each of the coin cells at 0.1 Coulomb (C) to a voltage of 4.6 V, followed by constant-current discharging at 0.1 C to a voltage of 2.5 V.

After the formation charging/discharging, each of the coin cells was subjected to a $1^{st}$ cycle of charging at 0.1 C as in the formation charging, and discharging at 0.1 C to 2.5 V, to measure a $1^{st}$ charge capacity and a $1^{st}$ discharge capacity of the coin cell. The results are shown in Table 2 below.

TABLE 2

| Example | $1^{st}$ charge capacity (mAh/g) | $1^{st}$ discharge capacity (mAh/g) | Initial efficiency (%) |
|---|---|---|---|
| Example 17 | 290.2 | 251.8 | 86.8 |
| Example 18 | 272.4 | 239.2 | 87.8 |
| Example 19 | 256.6 | 231.4 | 90.2 |
| Example 20 | 226.7 | 211.0 | 93.1 |
| Example 21 | 195.4 | 197.2 | 100.1 |
| Example 22 | 288.4 | 252.6 | 87.6 |
| Example 23 | 283.7 | 245.7 | 86.6 |
| Example 24 | 272.9 | 234.5 | 85.9 |
| Comparative Example 7 | 287.4 | 249.5 | 86.8 |
| Comparative Example 8 | 0 | 86.1 | — |
| Comparative Example 9 | 221.9 | 174.9 | 78.8 |

Referring to Table 2 above, in the coin cells of Examples 17 to 21 including a positive active material as a mixture of $Li_{1.18}Ni_{0.17}Co_{0.1}Mn_{0.56}O_2$ particles and δ-phase $VOPO_4$, the initial capacity was higher with a higher concentration of the δ-phase $VOPO_4$.

The coin cells of Examples 17 to 22 had improved initial efficiencies as compared with the lithium batteries of Comparative Examples 7 to 9.

Evaluation Example 2

Evaluation of High-Temperature Stability Characteristics—Differential Scanning Calorimetry ("DSC") Test After charging the coin cells of Examples 17 to 20, Examples 22 to 24, and Comparative Example 7 to about 4.6 V, each of the lithium batteries was disassembled to take the positive active material therefrom. A sample for differential scanning calorimetry was prepared from the positive active material and the same electrolyte as used in the manufacture of the coin cell. Each of the samples was analyzed using a differential scanning calorimeter (DSC, available from TA instruments) while being heated in $N_2$ atmosphere from about 25° C. to about 350° C. at a heating rate of about 10° C./min to measure changes in caloric value thereof. The results are shown in FIG. 5 and Table 3 below.

TABLE 3

| Example | Caloric value (J/g) | Peak temperature (° C.) |
|---|---|---|
| Example 17 | 1806 | 241.53 |
| Example 18 | 1635 | 239.32 |
| Example 19 | 1291 | 241.57 |
| Example 20 | 1112 | 242.98 |
| Example 22 | 1790 | 234.01 |
| Example 23 | 1788 | 239.36 |
| Example 24 | 1616 | 237.31 |
| Comparative Example 7 | 1894 | 240.10 |

Figure 5:
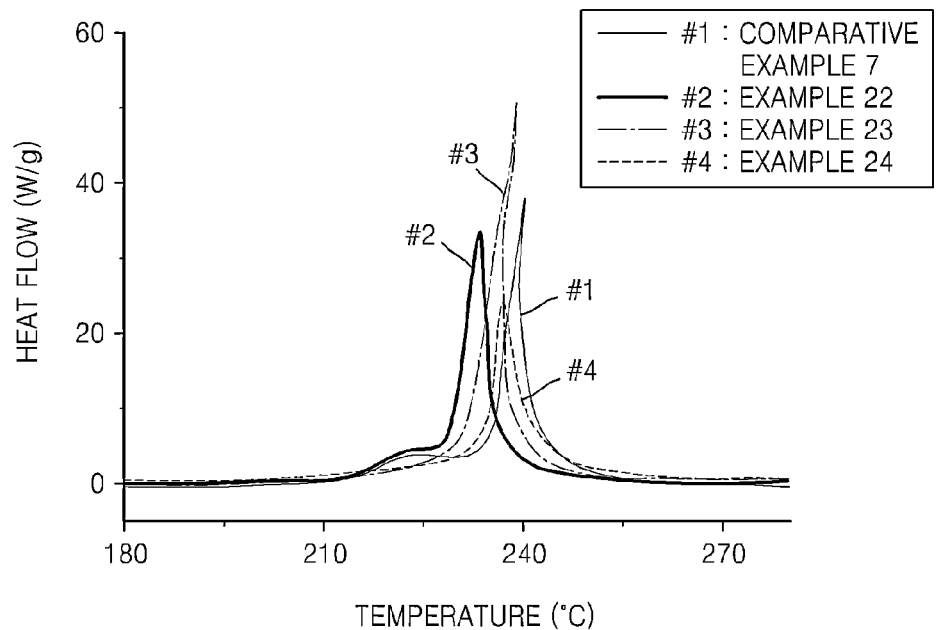
FIG. 5 is a graph of heat flow (Watts per gram, W/g) versus temperature (degree Centigrade, ° C.) illustrating high-temperature stability characteristics of lithium batteries of Examples 22 to 24, and Comparative Example 7.

Referring to FIG. 5 and Table 3, the coin cells of Examples 17 to 20 and Examples 22 to 24 were found to have reduced caloric values as compared with the coin cell of Comparative Example 7.

Evaluation Example 3

Evaluation of High-Temperature Stability Characteristics—High-Temperature Storage Test Each of the coin cells of Examples 23~24 and Comparative Example 7 were subjected to four charge/discharge cycles, including a $1^{st}$ cycle of charging at a constant current of 0.05 C to 4.45 V and discharging at a constant current of 0.05 C to 3.0 V, a $2^{nd}$ cycle of charging at a constant current at 0.1 C to 4.45 V and then to a current of 0.05 C while maintaining the voltage of 4.45 V constant, and discharging at a constant current of 0.1 C to 3.0 V, and a $3^{rd}$ cycle of charging at a constant current of 0.5 C to 4.45 V and then to 0.05 C while maintaining the voltage of 4.45 V constant, and discharging at a constant current of 0.2 C to 3.0 V. A discharge capacity from the $3^{rd}$ cycle was defined as a standard capacity.

In a $4^{th}$ charge/discharge cycle, the lithium battery was charged at a constant current of 0.5 C to 4.45 V and then to 0.05 C while maintaining the voltage of 4.45 V constant. Afterward, the charged lithium battery was left in a 90° C. oven for about 8 hours and took out of the oven, followed by being discharged at 0.2 C to a voltage of 3.0 V. Some results of the charge/discharge test are shown in Table 4 below. A capacity retention rate after high-temperature storage is defined as Equation 1 below.

Capacity retention rate after high-temperature storage [%]=[$4^{th}$ Cycle discharge capacity after high-temperature storage/Standard capacity]×100  Equation 1

(The standard capacity is a $3^{rd}$ cycle discharge capacity as described above)

TABLE 4

| Example | Capacity retention rate (%) |
|---|---|
| Example 23 | 94.0 |
| Example 24 | 94.1 |
| Comparative Example 7 | 93.1 |

Referring to Table 4 above, the coin cells of Examples 23 and 24 were found to have improved capacity retention rates after high-temperature storage as compared with the coin cell of Comparative Example 7, which indicates improvements in high-temperature stability of the coin cells of Examples 23 and 24.

Evaluation Example 4

Evaluation of Lifetime Characteristics

Formation charging/discharging was performed twice on the coin cells of Examples 22-24 and Comparative Example 7 at room temperature. In a first formation process constant-current charging was performed on each of the coin cells at 0.1 C to a voltage of 4.6 V, followed by constant-current discharging at 0.1 C to a voltage of 2.5 V.

After the formation charging/discharging, each of the coin cells was charged at 0.5 C as described above, and then discharged at 0.2 C to 2.5 V. This charging and discharging conditions were determined as standard charging and discharging conditions. A discharge capacity from this charge/discharge cycle was defined as a standard capacity.

Subsequently, charging at 1 C as described above and then discharging at 1 C to 2.5 V were followed. Then, a discharge capacity (a $1^{st}$ cycle discharge capacity) was measured. This charge and discharge cycle was repeated to evaluate cycle lifetime of the coin cell.

Figure 6:
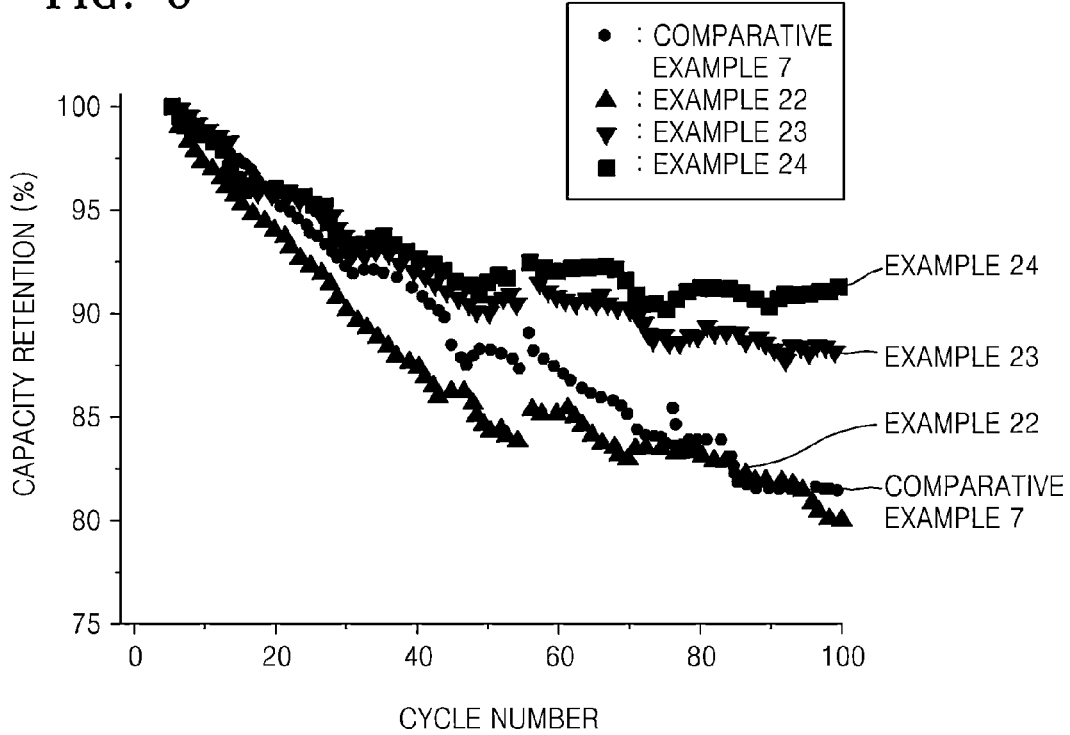
FIG. 6 is a graph of capacity retention (percent) versus cycle number illustrating lifetime characteristics of the lithium batteries of Examples 22 to 24 and Comparative Example 7.

A discharge capacity of the lithium battery at each charge/discharge cycle, and a $100^{th}$ cycle discharge capacity were measured. The results are shown in FIG. 6 and Table 5 below.

A cycle capacity retention rate of each of the coin cells was calculated based on the discharge capacity data according to Equation 2 below.

Cycle capacity retention rate (%)=$100^{th}$ cycle discharge capacity/$1^{st}$ cycle discharge capacity  Equation 2

TABLE 5

| Example | Discharge capacity at $1^{st}$ cycle (mAh) | Discharge capacity at $100^{th}$ cycle (mAh) | Cycle capacity retention rate (%) |
|---|---|---|---|
| Example 22 | 181.8 | 148.0 | 81.4 |
| Example 23 | 172.4 | 148.6 | 86.2 |
| Example 24 | 151.2 | 142.0 | 94.0 |
| Comparative Example 7 | 177.8 | 143.7 | 80.8 |

Referring to FIG. 6 and Table 5, the coin cells of Examples 22 to 24 were found to have improved cycle capacity retention rates as compared with the coin cell of Comparative Example 7. This result indicates that the coin cells of Examples 22 to 24 have improved lifetime characteristics as compared with the coin cell of Comparative Example 7.

As described above, according to the one or more of the above embodiments of the present disclosure, a positive active material includes lithium-containing oxide, and a lithium-intercalatable compound disposed on the surfaces of the lithium-containing oxide, so that the positive active material may have a reduced irreversible lithium capacity, and thus may improve initial efficiency and high-temperature stability of a lithium battery while maintaining a high capacity thereof.

It should be understood that the exemplary embodiments described herein shall be considered in a descriptive sense only and not for purposes of limitation. Descriptions of features, advantages, or aspects within each embodiment shall be considered as available for other similar features, advantages, or aspects in other embodiments.

What is claimed is:
1. A positive active material comprising:
   a lithium-containing oxide; and
   a lithium-intercalatable phosphate compound disposed on the lithium-containing oxide,
   wherein the phosphate compound includes both primary particles and secondary particles including the primary particles,
   wherein the primary particles of the phosphate compound have an average particle diameter of from about 0.01 nanometers to about 1,000 nanometers,
   wherein the secondary particles of the phosphate compound have an average particle diameter of from about 0.02 nanometers to about 15 micrometers,
   wherein at least some of the phosphate compound is in a form of a coating on at least a portion of a surface of a particle of the lithium-containing oxide, and the phosphate compound is further disposed inside a particle of the lithium-containing oxide, wherein the phosphate compound is a compound represented by Formula 1:

MOPO$_4$     Formula 1 wherein, in Formula 1,

M is at least one selected from a transition metal having an ionic diameter of from about 60 angstroms to about 90 angstroms and an oxidation number of +5, and wherein the lithium-containing oxide comprises at least one compound selected from compounds represented by Formulas 2 to 4:

$x$Li[Li$_{1/3}$Me$_{2/3}$]O$_2$-(1-$x$)LiMe'O$_2$     Formula 2 wherein, in Formula 2,

0<$x$<0.9;

Me is at least one element selected from manganese, molybdenum, tungsten, vanadium, titanium, zirconium, ruthenium, rhodium, palladium, osmium, iridium, and platinum; and Me' is at least one element selected from nickel, manganese, and cobalt;

$y$Li[Li$_{1/3}$((M1)$_a$(M2)$_b$(Mn)$_c$)$_{2/3}$]O$_2$-(1-$y$)LiMe'O$_2$     Formula 3 wherein in Formula 3,

0≤$a$≤⅓;

0≤$b$≤⅓;

$a+b+c=1$;

0<$y$<0.9; and

M1 is at least one element selected from nickel, copper, zinc, cobalt, chromium, iron, and magnesium; and M2 is at least one element selected from molybdenum, tungsten, vanadium, titanium, zirconium, ruthenium, rhodium, palladium, osmium, iridium, and platinum;

Li$_d$Co$_{1-e-g}$Ni$_e$(M3)$_g$O$_{2-j}$(X1)$_j$     Formula 4 wherein, in Formula 4, 0.8<$d$≤1.6;

0≤$e$≤1;

0≤$g$≤0.5;

0≤$j$≤1;

M3 is at least one element selected from nickel, cobalt, copper, magnesium, sodium, calcium, titanium, zinc, gallium, germanium, aluminum, chromium, magnesium, strontium, molybdenum, tungsten, vanadium, titanium, zirconium, ruthenium, rhodium, palladium, osmium, iridium, silver, gold, hafnium, tin, and platinum; and X1 is at least one element selected from oxygen, fluorine, sulfur, and phosphorus.

2. The positive active material of claim 1, wherein the phosphate compound comprises at least one selected from MoOPO$_4$, TiOPO$_4$, VOPO$_4$, TaOPO$_4$, and NbOPO$_4$.

3. The positive active material of claim 1, wherein the phosphate compound has a layered structure or a tunneled structure.

4. The positive active material of claim 1, wherein the phosphate compound has a single crystalline structure.

5. The positive active material of claim 1, wherein the phosphate compound has a crystalline structure of at least one selected from an $\alpha_I$ phase, $\alpha_{II}$ phase, $\beta$ phase, $\gamma$ phase, $\delta$ phase, $\epsilon$ phase, and a $\omega$ phase.

6. The positive active material of claim 1, wherein an amount of the phosphate compound is from about 0.001 parts to about 30 parts by weight, based on 100 parts by weight of the lithium-containing oxide.

7. The positive active material of claim 1, wherein the coating has a thickness of from about 0.01 nanometers to about 9.99 micrometers.

8. The positive active material of claim 1, wherein an amount of the phosphate compound is from about 0.001 parts to about 10 parts by weight, based on 100 parts by weight of the lithium-containing oxide.

9. The positive active material of claim 1, wherein an amount of the phosphate compound is from about 0.001 parts to about 5 parts by weight, based on 100 parts by weight of the lithium-containing oxide.

10. A lithium battery comprising: a positive electrode; an electrolyte; and a negative electrode, wherein the positive electrode comprises the positive active material of claim 1.

11. The lithium battery of claim 10, wherein an operating voltage of the positive active material is in the range of 4.3 Volts±0.1 Volts versus lithium or greater.

12. A method of preparing a positive active material, the method comprising:

heating a transition metal precursor to prepare a lithium-intercalatable phosphate compound; and contacting the phosphate compound with a lithium-containing oxide to prepare the positive active material, which comprises a mixture of the lithium-containing oxide and the phosphate compound, wherein:

the phosphate compound includes both primary particles and secondary particles, the secondary particles including the primary particles, the primary particles of the phosphate compound have an average particle diameter of from about 0.01 nanometers to about 1,000 nanometers, the secondary particles of the phosphate compound have an average particle diameter of from about 0.02 nanometers to about 15 micrometers, at least some of the phosphate compound is in a form of a coating on at least a portion of a surface of a particle of the lithium-containing oxide, and the phosphate compound is further disposed inside a particle of the lithium-containing oxide, the phosphate compound is a compound represented by Formula 1:

MOPO$_4$     Formula 1 wherein, in Formula 1,

M is at least one selected from a transition metal having an ionic diameter of from about 60 angstroms to about 90 angstroms and an oxidation number of +5, and the lithium-containing oxide comprises at least one compound selected from compounds represented by Formulas 2 to 4:

$x$Li[Li$_{1/3}$Me$_{2/3}$]O$_2$-(1-$x$)LiMe'O$_2$     Formula 2 wherein, in Formula 2,

0<$x$<0.9;

Me is at least one element selected from manganese, molybdenum, tungsten, vanadium, titanium, zirconium, ruthenium, rhodium, palladium, osmium, iridium, and platinum; and Me' is at least one element selected from nickel, manganese, and cobalt;

$$yLi[Li_{1/3}((M1)_a(M2)_b(Mn)_c)_{2/3}]O_2\text{-}(1-y)LiMe'O_2 \quad \text{Formula 3}$$

wherein, in Formula 3, $0 \leq a \leq 1/3$;

$0 \leq b \leq 1/3$;

$a+b+c=1$;

$0<y<0.9$; and

M1 is at least one element selected from nickel, copper, zinc, cobalt, chromium, iron, and magnesium; and M2 is at least one element selected from molybdenum, tungsten, vanadium, titanium, zirconium, ruthenium, rhodium, palladium, osmium, iridium, and platinum;

$$Li_dCo_{1-e-g}Ni_e(M3)_gO_{2-j}(X1)_j \quad \text{Formula 4}$$

wherein, in Formula 4, $0.8<d \leq 1.6$;

$0 \leq e \leq 1$;

$0 \leq g \leq 0.5$;

$0 \leq j \leq 1$;

M3 is at least one element selected from nickel, cobalt, copper, magnesium, sodium, calcium, titanium, zinc, gallium, germanium, aluminum, chromium, magnesium, strontium, molybdenum, tungsten, vanadium, titanium, zirconium, ruthenium, rhodium, palladium, osmium, iridium, silver, gold, hafnium, tin, and platinum; and X1 is at least one element selected from oxygen, fluorine, sulfur, and phosphorus.

13. The method of claim 12, wherein the transition metal precursor is at least one selected from $MoOPO_4 \cdot 2H_2O$, $TiOPO_4 \cdot 2H_2O$, $VOPO_4 \cdot 2H_2O$, $VOHPO_4 \cdot 0.5H_2O$, $VPO_4 \cdot H_2O$, $TaPO_4 \cdot 3.4H_2O$, $TaOPO_4 \cdot 2.1H_2O$, $TaOPO_4 \cdot 2.3H_2O$, $TaOPO_4 \cdot 1.3H_2O$, and $NbOPO_4 \cdot H_2O$.

14. The method of claim 12, wherein the heating is performed at a temperature from about 500° C. to about 1,200° C. for about 12 hours to about 48 hours.

15. The method of claim 12, wherein an amount of the phosphate compound is from about 0.001 parts to about 30 parts by weight, based on 100 parts by weight of the lithium-containing oxide.

16. A method of preparing a positive active material, the method comprising:
heating a transition metal precursor to prepare a lithium-intercalatable phosphate compound; and
forming a coating of the phosphate compound on at least a portion of a surface of a particle of a lithium-containing oxide by a surface-treatment method to prepare the positive active material, wherein:
at least some of the phosphate compound is further disposed inside a particle of the lithium-containing oxide,
the phosphate compound includes both primary particles and secondary particles, the secondary particles including the primary particles,
the primary particles of the phosphate compound have an average particle diameter of from about 0.01 nanometers to about 1,000 nanometers,
the secondary particles of the phosphate compound have an average particle diameter of from about 0.02 nanometers to about 15 micrometers,
the phosphate compound is a compound represented by Formula 1:

$$MOPO_4 \quad \text{Formula 1}$$

wherein, in Formula 1,

M is at least one selected from a transition metal having an ionic diameter of from about 60 angstroms to about 90 angstroms and an oxidation number of +5, and the lithium-containing oxide comprises at least one compound selected from compounds represented by Formulas 2 to 4:

$$xLi[Li_{1/3}Me_{2/3}]O_2\text{-}(1-x)LiMe'O_2 \quad \text{Formula 2}$$

wherein, in Formula 2, $0<x<0.9$;

Me is at least one element selected from manganese, molybdenum, tungsten, vanadium, titanium, zirconium, ruthenium, rhodium, palladium, osmium, iridium, and platinum; and Me' is at least one element selected from nickel, manganese, and cobalt;

$$yLi[Li_{1/3}((M1)_a(M2)_b(Mn)_c)_{2/3}]O_2\text{-}(1-y)LiMe'O_2 \quad \text{Formula 3}$$

wherein, in Formula 3, $0 \leq a \leq 1/3$;

$0 \leq b \leq 1/3$;

$a+b+c=1$;

$0<y<0.9$; and

M1 is at least one element selected from nickel, copper, zinc, cobalt, chromium, iron, and magnesium; and M2 is at least one element selected from molybdenum, tungsten, vanadium, titanium, zirconium, ruthenium, rhodium, palladium, osmium, iridium, and platinum;

$$Li_dCo_{1-e-g}Ni_e(M3)_gO_{2-j}(X1)_j \quad \text{Formula 4}$$

wherein, in Formula 4, $0.8<d \leq 1.6$;

$0 \leq e \leq 1$;

$0 \leq g \leq 0.5$;

$0 \leq j \leq 1$;

M3 is at least one element selected from nickel, cobalt, copper, magnesium, sodium, calcium, titanium, zinc, gallium, germanium, aluminum, chromium, magnesium, strontium, molybdenum, tungsten, vanadium, titanium, zirconium, ruthenium, rhodium, palladium, osmium, iridium, silver, gold, hafnium, tin, and platinum; and X1 is at least one element selected from oxygen, fluorine, sulfur, and phosphorus.

17. The method of claim 16, wherein the surface-treatment method is a dry surface treatment method and is at least one selected from planetary ball milling, low-speed ball milling, high-speed ball milling, hybridization, and mechanofusion.

18. The method of claim 16, wherein the surface-treatment method is a wet surface treatment method and is at least one selected from spraying, co-precipitation, and dipping.

19. The method of claim 16, wherein the coating has a thickness of from about 0.01 nanometers to about 9.99 micrometers.

20. The method of claim 16, wherein an amount of the phosphate compound is from about 0.001 parts to about 10 parts by weight, based on 100 parts by weight of the lithium-containing oxide.

21. The method of claim 16, wherein an amount of the phosphate compound is from about 0.001 parts to about 5 parts by weight, based on 100 parts by weight of the lithium-containing oxide.

* * * * *